United States Patent [19]
Yamazaki et al.

[11] Patent Number: 5,293,586
[45] Date of Patent: Mar. 8, 1994

[54] DATA PROCESSING SYSTEM FOR DEVELOPMENT OF OUTLINE FONTS

[75] Inventors: Takanaga Yamazaki, Kodaira; Shiro Baba, Tokorozawa, both of Japan; Keiichi Kurakazu, Princeton, N.J.; Masaharu Ando, Kodaira, Japan; Toshio Tanaka, Yokohama, Japan; Susumu Kaneko, Mitaka, Japan

[73] Assignee: Hitachi, Ltd., Tokyo, Japan

[21] Appl. No.: 958,610

[22] Filed: Oct. 8, 1992

Related U.S. Application Data

[63] Continuation of Ser. No. 415,173, Sep. 29, 1989, abandoned.

[30] Foreign Application Priority Data

Sep. 30, 1988 [JP] Japan .................. 63-244001
Jun. 15, 1989 [JP] Japan .................. 1-152718

[51] Int. Cl.⁵ .................................... G06F 15/62
[52] U.S. Cl. ............................ 395/164; 395/150
[58] Field of Search ................... 395/162–166, 395/275, 150

[56] References Cited

U.S. PATENT DOCUMENTS 3,793,631  2/1974  Silverstein et al. .......... 364/200
4,703,438 10/1987  Nishiyama et al. .......... 364/519

FOREIGN PATENT DOCUMENTS 55-143663  4/1979  Japan .
60-144829  1/1984  Japan .
60-160443  1/1984  Japan .
62-229359 10/1987  Japan .
63-39035   2/1988  Japan .

OTHER PUBLICATIONS

"MC68881/MC68882 Floating-Point Coprocessor User's Manual," Prentice Hall, 1987, pp. 1-1 to 1-15, 5-1 to 5-15.

Masazo Nakagawa, "Multiuser Operational Optical Printer Controller Featuring 20 Pages Per Minute", Nikkei Electronics, No. 417, Nikkei MacGraw Hill, Mar. 23, 1987, pp. 205-227., Japanese document with English translation provided.

Primary Examiner—Heather R. Herndon
Attorney, Agent, or Firm—Fay, Sharpe, Beall, Fagan, Minich & McKee

[57] ABSTRACT

A single chip microcomputer formed on a semiconductor substrate includes a central processing unit, a ROM storing therein a program for operating the central processing unit, a digital signal processor, and a multi-port RAM. The digital signal processor develops an outline font on the multi-port RAM in accordance with a program stored in a storage unit provided in the digital signal processor. This eliminates the necessity of development of an outline font by the central processing unit and allows high speed execution of such development of an outline font. Further, the central processing unit and the digital signal processor can operate in a parallel relationship.

21 Claims, 16 Drawing Sheets

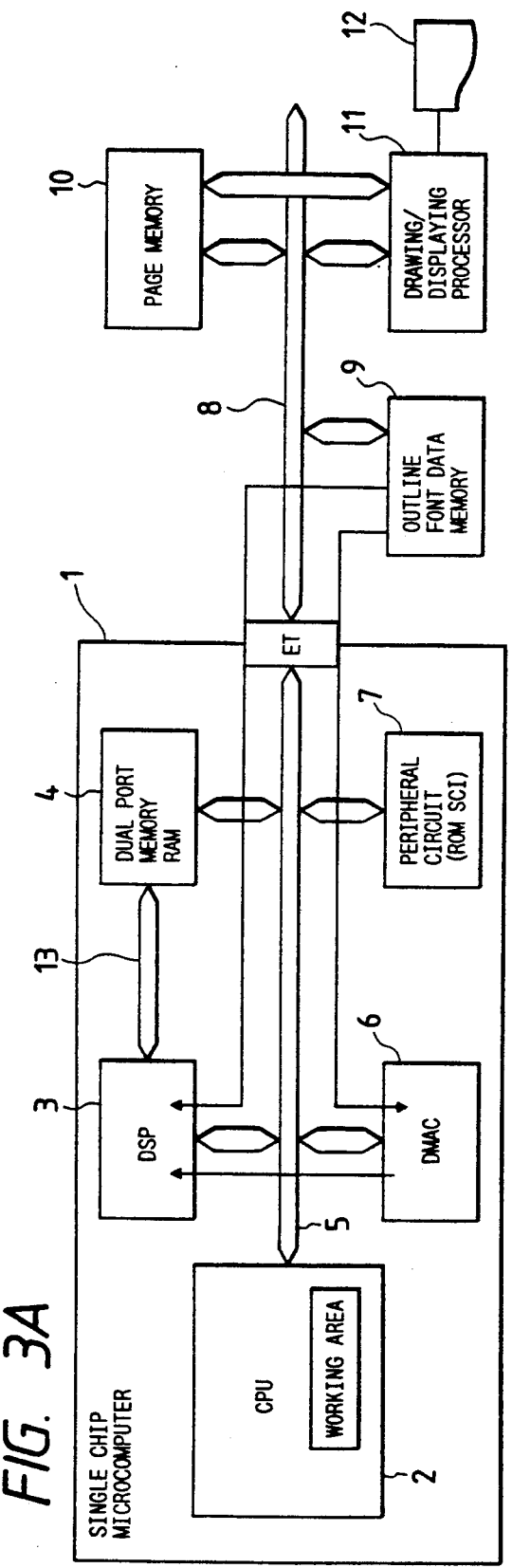
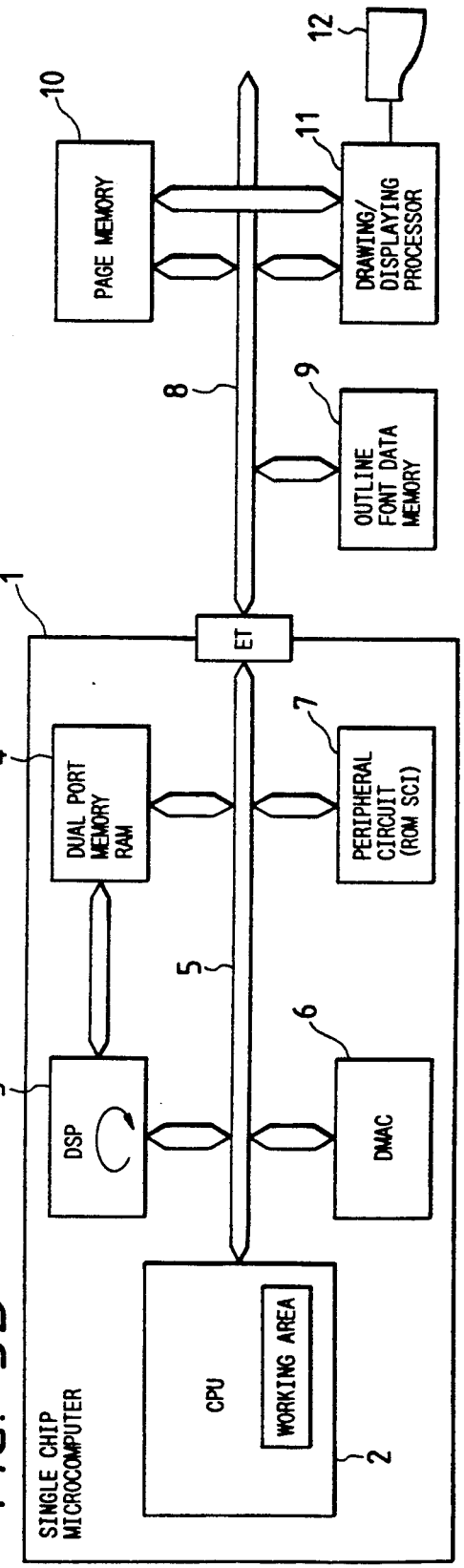

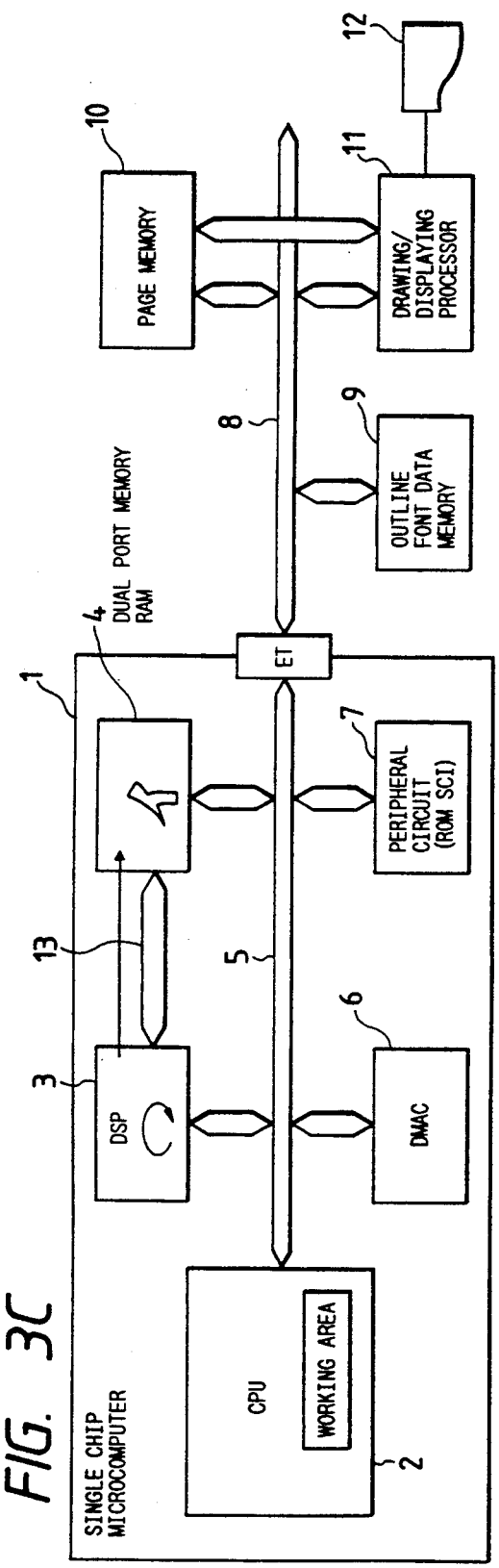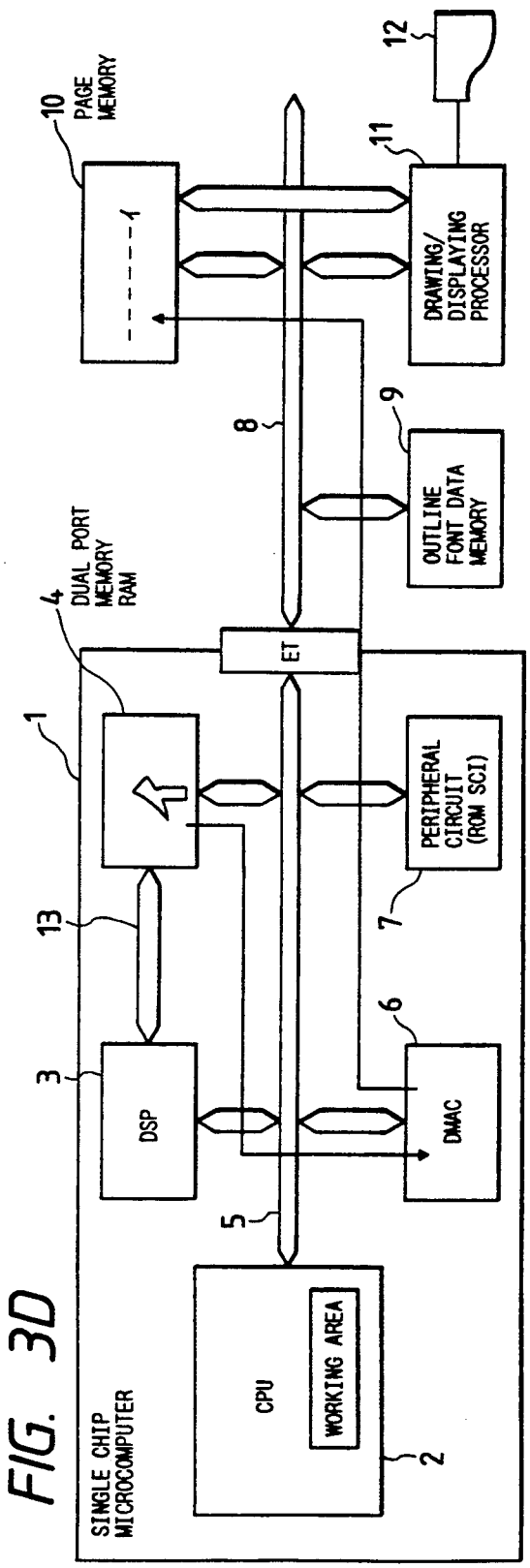

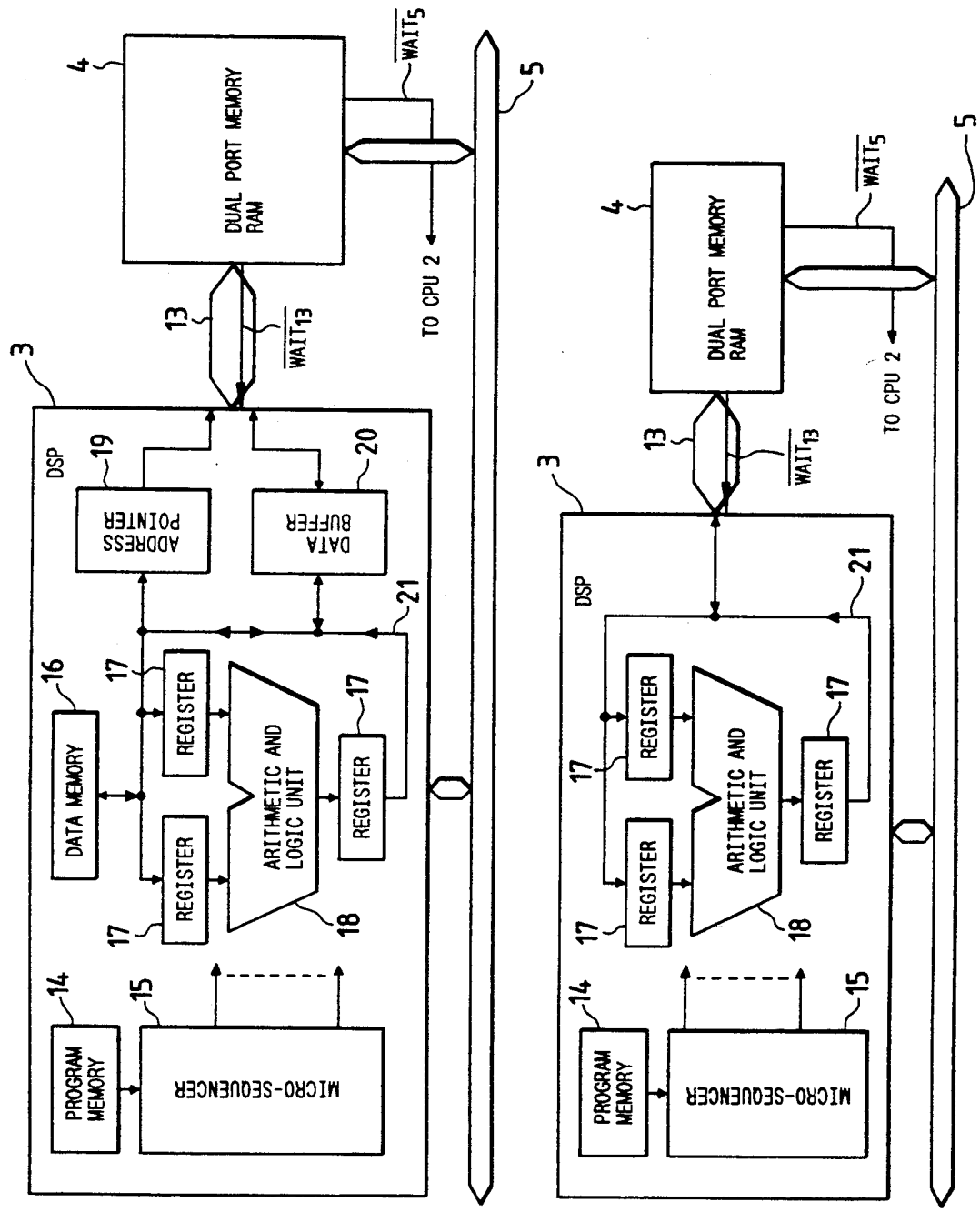

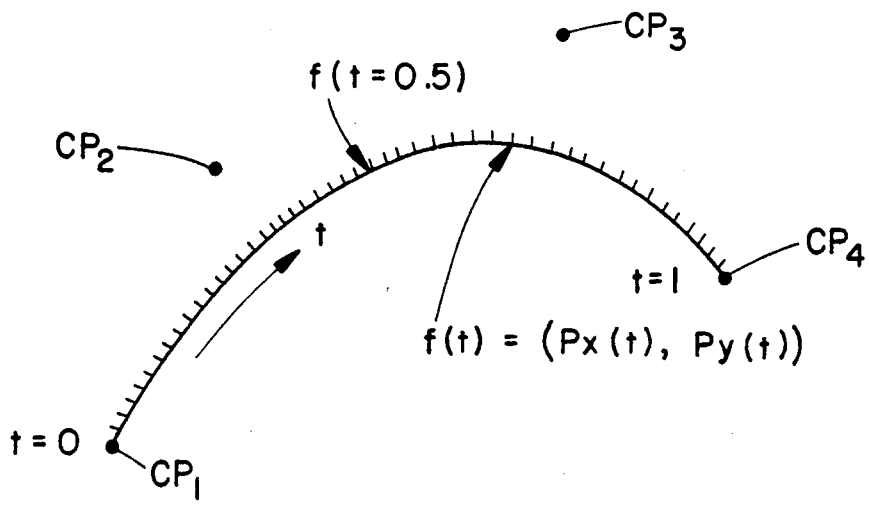

$CP_1$ = CONTROL POINT $(X_1, Y_1)$ $CP_2$ = CONTROL POINT $(X_2, Y_2)$ $CP_3$ = CONTROL POINT $(X_3, Y_3)$ $CP_4$ = CONTROL POINT $(X_4, Y_4)$

I  STEP 1 : OBTAINING CONSTANT VALUES a~f ON THE BASIS OF THE CONTROL POINTS.

$a = 3(X_2 - X_1)$, $b = 3(X_1 - 2X_2 + X_3)$, $c = -X_1 + 3X_2 - 3X_3 + X_4$, $d = 3(Y_2 - Y_1)$, $e = 3(Y_1 - 2Y_2 + Y_3)$, $f = -Y_1 + 3Y_2 - 3Y_3 + Y_4$.

II  STEP 2 : OBTAINING f(t) BY VARYING "t" FROM "0" TO "1"

$Px(t) = X_1 + at + bt^2 + ct^3$ $Py(t) = Y_1 + dt + et^2 + ft^3$ $f(t) = [\underbrace{(X_1 + at + bt^2 + ct^3)}_{\text{X-COORDINATE}}, \underbrace{(Y_1 + dt + et^2 + ft^3)}_{\text{Y-COORDINATE}}]$

FIG. 20

DATA PROCESSING SYSTEM FOR DEVELOPMENT OF OUTLINE FONTS

This is a continuation of copending application Ser. No. 07/415,173 filed on Sep. 29, 1989, now abandoned.

BACKGROUND OF THE INVENTION

This invention relates to a data processing system, and more particularly, to a data processing system which utilizes a technique applied to a microcomputer for development of an outline font for a bit map display using a CRT (cathode ray tube), a plasma display device, a liquid crystal display device, or a page printer such as i) a laser beam printer, ii) a liquid crystal printer, or iii) an LED (light emitting diode) printer.

One of the formats used to draw a pattern in a bit map memory is a dot font format wherein a pattern is represented in a dot matrix. The dot font format is easy to handle and allows a pattern to be drawn at high speed because the font data in the matrix is actually a representation of dots corresponding to the picture elements. However, it is difficult to rotate font data to an arbitrary angle. Also, where the dot density is comparatively low, an enlarged display results in a rough or uneven profile. If the dot density is increased, the amount of data will increase.

The problems which arise when using a dot matrix system, such as a rough profile and an increased amount of data, can be eliminated by employing a vector graphics technique wherein a pattern is drawn in accordance with outline font data. The outline font data has a data structure wherein a profile of a pattern is defined as an aggregate of lines.

For example, outline font data includes information indicative of the type of line needed and information concerning the starting point, the end point, and/or some other control points of such line. The type of line can be a straight line or a free curved line such as a short line vector, an arc, a spline curve or a Bezier curve.

When a conventional single chip microcomputer is employed to provide a system which draws an outline font in accordance with outline font data as described above, a CPU (central processing unit) core receives, from an external memory, data indicating the types of lines comprising the outline font. The CPU core includes a direct memory access controller and some other peripheral circuits. The CPU core then decodes the received outline font data and executes calculations for development into a dot pattern. The CPU core transfers the corresponding outline font to an external working memory which functions as a font cache memory. Then, either the CPU or the direct memory access controller transfers the outline font from the working memory to a page memory such as a frame buffer memory. The DMAC is built in the single chip microcomputer and has a data block transfer function such as a BITBLT (bit block transfer) function. Drawing of the outline font into the page memory is completed in this manner. When, for example, the drawn contents of the page memory are to be printed, a drawing/displaying processor, such as a CRT controller, sends out a document composed of an outline font completed on the page memory as video signals to a laser beam printer engine.

An example of a document relating to an outline font drawing system of the type described above is Nikkei Electronics, No. 417, Nikkei MacGraw Hill, Mar. 23, 1987, pp. 205-227.

Investigations of the prior art described above have revealed many drawbacks. In particular, since the CPU core executes generation of an outline font, it cannot execute any other operation simultaneously. This deteriorates the operation efficiency of the entire system. Development of an outline font requires calculations of coordinate points of free curved lines which involve a large amount of floating point calculations. Also, a coordinate transformation such as an enlargement, a reduction or a rotation involves a large amount of floating point calculations. Floating point calculations greatly burden the CPU core.

It may seem advantageous to add an FPU (floating point arithmetic unit) as a co-processor in order to increase the speed of a calculation for a free curved line and a coordinate transformation. But, even though the speed of calculation of existing FPUs is several microseconds for routine calculations, floating point calculations require much more calculating time. There is a limit to the increase of the speed of calculation because of the architecture of the FPU. Since the FPU is closely coupled to the CPU, the CPU core cannot proceed with independent data processing while the FPU is calculating. The instructions for both the CPU and FPU are common to each other so the CPU core does not execute a new command until the FPU completes execution of a required coprocessor instruction. In other words, CPU and FPU instructions are stored in a common memory space. When the FPU is executing calculations which aid in the generation of an outline font, other work cannot be executed by the system. Therefore, the operation efficiency of the entire system is not significantly improved when an FPU is employed.

SUMMARY OF THE INVENTION

A microprocessor and a digital signal processor, which is instructed by the microprocessor to execute an operation, are included on a single semiconductor substrate.

In order to avoid possible interference between a storing operation and bus access by the microprocessor when the result of a calculation by the digital signal processor is stored in a RAM (random access memory), a dual port memory may be provided which can be accessed from both the digital signal processor and the microprocessor by way of different buses.

The construction, including the microprocessor, digital signal processor and dual port memory, can also be formed as a multi-chip system on a circuit board.

In order to utilize the data processing system formed on either a single semiconductor chip or a multi-chip system for development of an outline font, a data processing algorithm for developing outline font data into the dual port memory in the form of a pattern of dots may be contained in a control storage device which is built in the digital signal processor.

If information developed in the dual port memory is transferred to a frame buffer memory or a page memory to draw the font, a direct memory access controller, capable of being controlled for block transfer of data, may be connected to a common bus. The common bus couples the access ports of the dual port memory and the microprocessor.

Further, in order to utilize the dual port memory as a font cache memory, the microprocessor includes an area for storing information indicative of a type of outline font. The digital signal processor develops the type of font upon receiving instructions from the microprocessor.

With the means described above, the digital signal processor included in the data processing system has an architecture for executing a large amount of calculations at high speed. For example, a multiplier and an adder are used for cumulative multiplications and execution of parallel pipe line processing of instruction fetch and data transfer and calculation. Consequently, the data processing system can execute required calculations at a higher speed than an alternative data processing system which employs a co-processor such as an FPU. A system which includes the digital signal processor and the microprocessor can execute a large amount of calculations at a higher speed than an alternative data processing system which includes only a microprocessor and a co-processor, such as an FPU.

Further, the digital signal processor itself acts to execute a series of steps of data processing using a data processing algorithm stored in the built-in control storage device in accordance with an instruction of the microprocessor which operates in parallel to the DSP. In other words, since the digital signal processor does not have execution instructions which are written amongst the instructions of the microprocessor, it can proceed with data processing independently of the operation of the microprocessor. Consequently, when the digital signal processor is executing data processing such as a floating point calculation, the microprocessor can proceed with independent or different processing. This will act to permit the digital signal processor to execute a large amount of calculations at a high speed without imposing a great burden to the microprocessor and without restraining operation of the microprocessor significantly.

The dual port memory which can be accessed from both the microprocessor and the digital signal processor separately acts to permit storage of a result of a calculation by the digital signal processor. For example, development of an outline font is stored in a RAM to be executed by way of a dedicated bus which is different from the common bus to which the microprocessor is coupled. This will assure perfection of parallel operation of the microprocessor and the digital signal processor. Efficiency in data processing by the digital signal processor is increased.

Where the dual port memory is utilized as a font cache memory, development of an outline font need not be executed for an outline font which has already been developed and is held in the dual port memory.

When drawing a dot pattern in the frame buffer memory or the page memory by way of outline font development, and when the font must be produced using a memory write operation as well as a memory read operation in order to execute painting out of the inside of an outline font or execute logical operations of picture elements upon outline font development, the outline font is developed in the dual port memory, which can be accessed at a higher speed than the frame buffer memory or the page memory. Then, the font is transferred to the frame buffer memory to reduce the entire read/write frequency from and into the relatively low speed frame buffer memory. The alternative includes use of a memory read operation and a memory write operation executed successively and repetitively in order to execute logical operations of picture elements for developing an outline font directly on the page memory or the frame buffer memory and painting out of the inside of the outline font after such development. In other words, the low speed frame buffer memory or page memory must be accessed for writing only when a font produced on the dual port memory is to be transferred. Consequently, the processing time through final completion of the drawing can be reduced.

The direct memory access controller improves the efficiency of data transfer from the dual port memory to the frame buffer memory or the page memory. When a direct memory access controller is provided, the processing time through final completion of drawing in the frame buffer memory or the like can be reduced. Even when a logical operation of a picture element upon painting out of the inside of an outline font or development of an outline font is not executed, processing time is reduced.

Where the dual port memory, utilized as a working area such as a font cache memory area, is formed on a same semiconductor substrate as the microprocessor and the digital signal processor, the speed of data processing or data transfer is increased. There is also an increase in the speed of access to the dual port memory for development of a font by the digital signal processor, increase in the speed of access to the dual port memory for painting out processing of a developed font, and an increase in the speed of access to the dual port memory for transfer of a font produced on the dual port memory to the outside by the microprocessor or the direct memory access controller.

In the embodiments described below, a data processing system is disclosed which comprises a microprocessor formed on a semiconductor substrate, and a digital signal processor formed on the semiconductor substrate. The DSP includes a sequence control means which is instructed to execute an operation by the microprocessor, an executing means, and a control storage means in which a data processing algorithm is described. A data processing system is also disclosed which further comprises a dual port memory which can be accessed from both the digital signal processor and the microprocessor by way of separate buses.

Further, a data processing system is disclosed which comprises a microprocessor, a digital signal processor, and a dual port memory which can be accessed from both of the digital signal processor and the microprocessor by way of separate buses. The DSP includes a sequence control means which is instructed to execute an operation by the microprocessor, an executing means, and a control storage in which a data processing algorithm is described. Particularly, the control storage means contains a data processing algorithm for developing outline font data in the dual port memory in the form of a pattern of dots. Further, a direct memory access controller capable of being controlled for block transfer of data is coupled to an access port of the dual port memory on the side of the microprocessor. Further, the microprocessor has an area for storing information indicative of a type of an outline font development.

It is an object of the present invention to provide a data processing system which can execute a large amount of calculations at a high speed without imposing a great burden on a microprocessor or without significantly restricting operation of a microprocessor.

It is another object of the present invention to provide a data processing system which can execute development of an outline font efficiently.

The above and other objects and novel features of the present invention will become apparent from the description of the accompanying drawings.

BRIEF DESCRIPTION OF THE DRAWINGS

FIGS. 3A, 3B, 3C, 3D and 3E are block diagrams illustrating successive steps of operation of the outline font drawing system of FIG. 2;

FIG. 6 is a block diagram showing a connection between a digital signal processor and a dual port memory;

FIG. 7 is a block diagram showing another connection between a digital signal processor and a dual port memory;

FIG. 20 shows the calculation for developing the font data of a curved line into a dot pattern.

DESCRIPTION OF THE PREFERRED EMBODIMENTS

Single Chip Microcomputer

Figure 1:
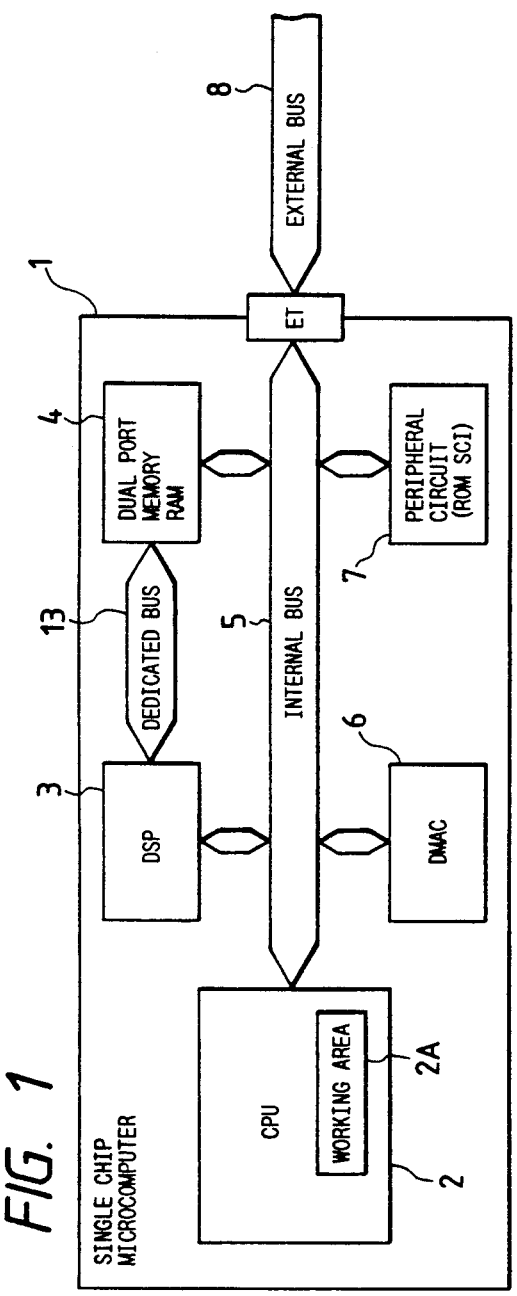
FIG. 1 is a block diagram of a single chip microcomputer showing a preferred embodiment of the present invention.

Referring first to FIG. 1, a block diagram of a single chip microcomputer according to a preferred embodiment of the present invention is shown. The single chip microcomputer shown is generally denoted at 1 and includes: a CPU 2, serving as a microprocessor; a digital signal processor (hereinafter referred to only as DSP) 3, having a floating point calculation function for executing development of an outline font; a direct memory access controller (hereinafter referred to only as DMAC) 6, having a data block transfer controlling function such as a bit block transfer function; a dual port memory 4; and a peripheral circuit 7, including a ROM in which an operation program of the CPU 2 is stored and a serial communication interface controller (hereinafter referred to only as SCI) for executing communication of data from and to the outside. Those circuit blocks of the single chip microcomputer 1 are integrated on a single semiconductor substrate. The circuit blocks are connected in common to an internal bus 5. The DSP 3 and the dual port memory 4 are connected to each other by way of a dedicated bus 13.

The CPU 2 reads instructions from the operation program written and stored in advance in the ROM included in the peripheral circuit 7, decodes the read instructions, executes calculations for execution of the commands, and produces various control signals required for data transmission.

The DSP 3 includes a micro ROM (not shown), in which a data processing algorithm is programmed in microcommands. The micro ROM reads the microcommands in accordance with a predetermined procedure and controls an accumulator, a memory, and an input/output circuit. DSP 3 includes multipliers and accumulators for changing multiplications which are processed by software in a general-purpose microprocessor and has an architecture that enables parallel pipe line processing of instruction fetch, data transfer and calculation. The calculation is due to separation of an instruction transfer system and a data transfer system in order to achieve high speed calculations, such as accumulation calculations. Accumulation calculation appears in floating point calculations and attains high speed data transfer for high speed calculations. In the present embodiment, the data processing algorithm described in advance in the micro ROM has contents for execution. For example, the algorithm describes the development of an outline font, coordinate transformation of an outline font such as enlargement, reduction, translation or rotation, or painting out of the inside of a developed font.

The dual port memory 4 is utilized, though not particularly limited, as a working area for development or production of an outline font. In order to allow the dual port memory 4 to be utilized as a font cache memory, the CPU 2 is provided with a working area 2A into which information indicative of a type of an outline font formed on the dual port memory 4 is stored. Accordingly, when the CPU 2 executes development of an outline font, it refers to the working area 2A. Consequently, time required for developing an identical outline font twice can be saved. The manner of processing wherein the dual port memory 4 is utilized as a font cache memory is selected by the operation program of the CPU 2. In particular, the operation program written and stored in advance in the ROM is such that, before the CPU 2 instructs the DSP 3 of development of an outline font, it checks information stored in the working area 2A. If a desired font has already been developed in the dual port memory 4, then the CPU 2 makes use of the font developed already in the dual port memory 4. It is to be noted that, though not particularly limited, the internal bus 5 is coupled to an external bus 8 by way of an external terminal.

Outline Font Drawing System

Figure 2:
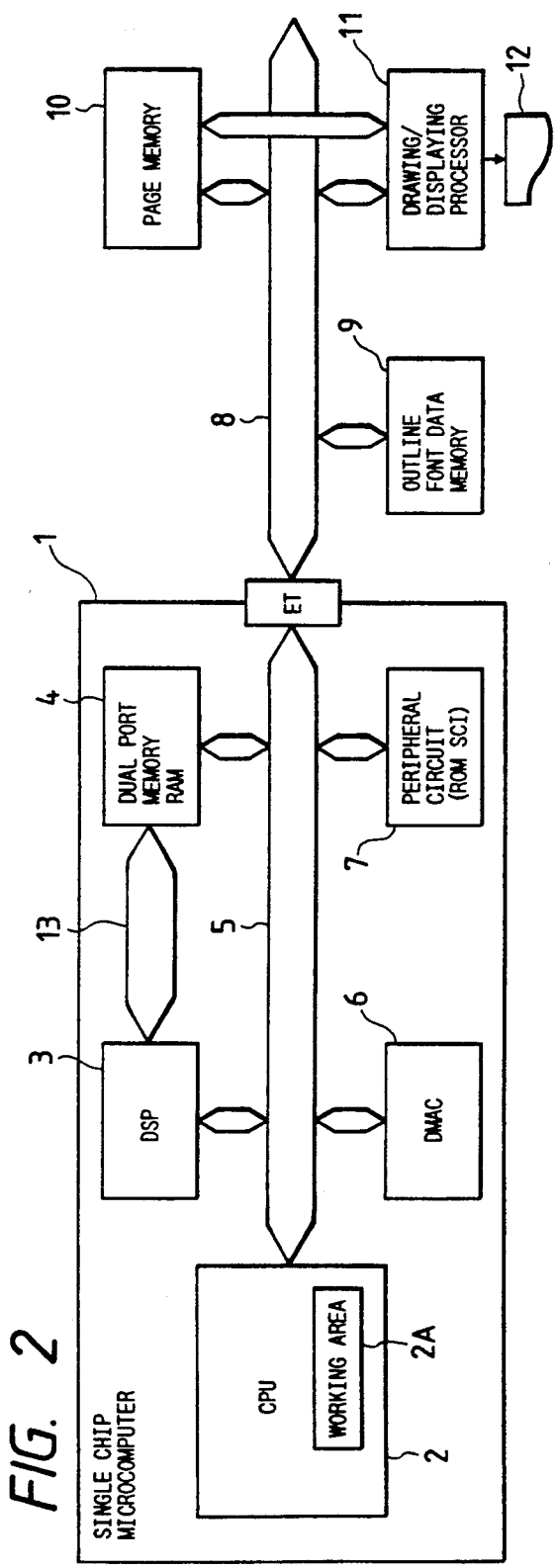
FIG. 2 is a block diagram showing an outline font drawing system to which the single chip microcomputer of FIG. 1 is applied.

Referring now to FIG. 2, an outline font drawing system in which the single chip microcomputer 1 described above is incorporated as shown. The system shown is applied, though not particularly limited, to a laser beam printer (hereinafter referred to only as LBP).

The single chip microcomputer 1 is connected to the external bus 8 together with a memory 9 for storing font data therein, a page memory 10 for drawing a character or a figure thereon, and a drawing/displaying processor 11 for drawings a figure thereon and for sending out a video signal to a printer engine 12. It is to be noted that an ACRTC (Advanced Cathode Ray Tube Controllers HD63484-4, HD63484-6, HD63484-8) by Kabushiki Kaisha Hitachi Seisakusho may be employed for the drawing/displaying processor 11.

Figure 11:
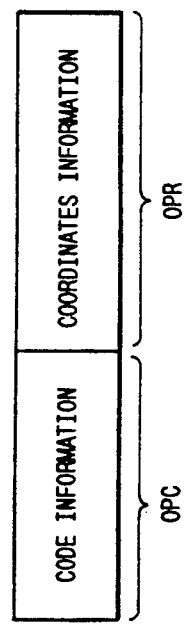
FIG. 11 is a representation showing a format of outline font data.

Though not particularly limited, outline font data stored in the memory 9 have a format which is composed, as shown in FIG. 11, of an operation code designating area OPC, including coded information assigned for a type of a line such as a straight line or a short line vector, an arc, a spline curved line or a Bezier curved line, and an operand designating field OPR, including coordinate information of a starting point and an end point of a line specified by the coded information in the operation codes designating area OPC, and some other control points which are required when a free curved line is to be defined. For example, a profile of a character or a figure which is constructed from a plurality of curved lines and/or straight lines is defined by an aggregate of outline font data which define the individual line segments included in the profile as described above. Various outline font data are stored for each character or figure in the memory 9.

Outline Font Drawing Operation

Figure 3E:
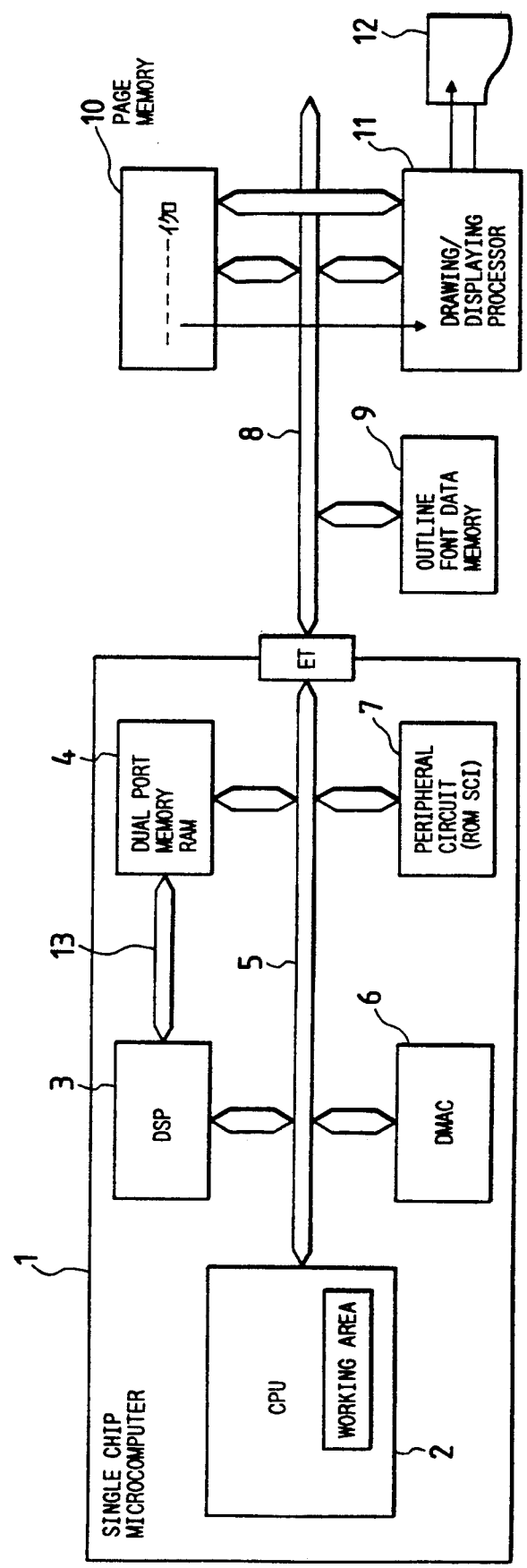
Figure 4A:
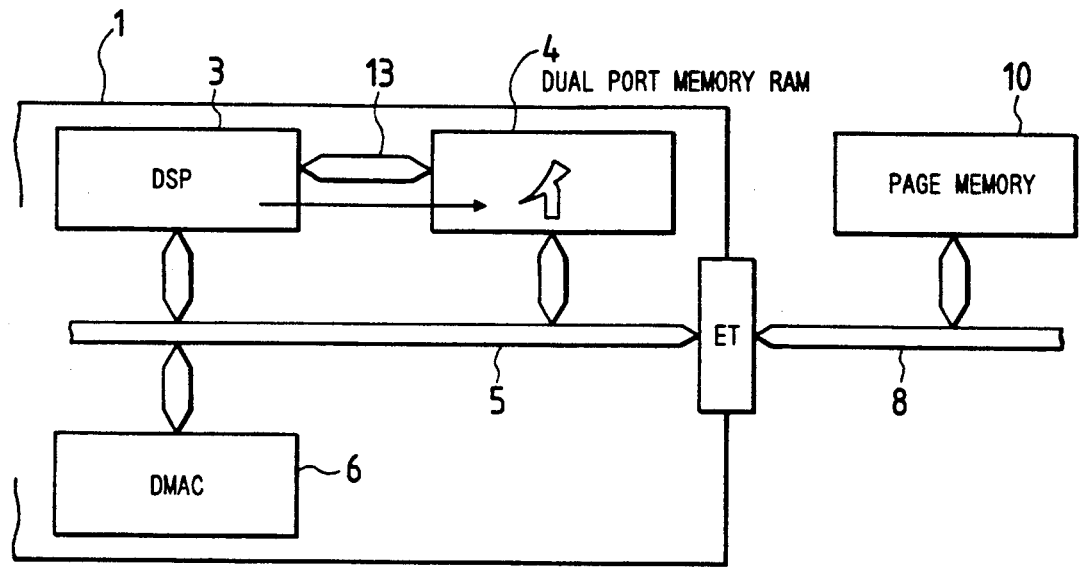
FIGS. 4A and 4B are representations illustrating a form of development and transfer of an outline font.
Figure 4B:
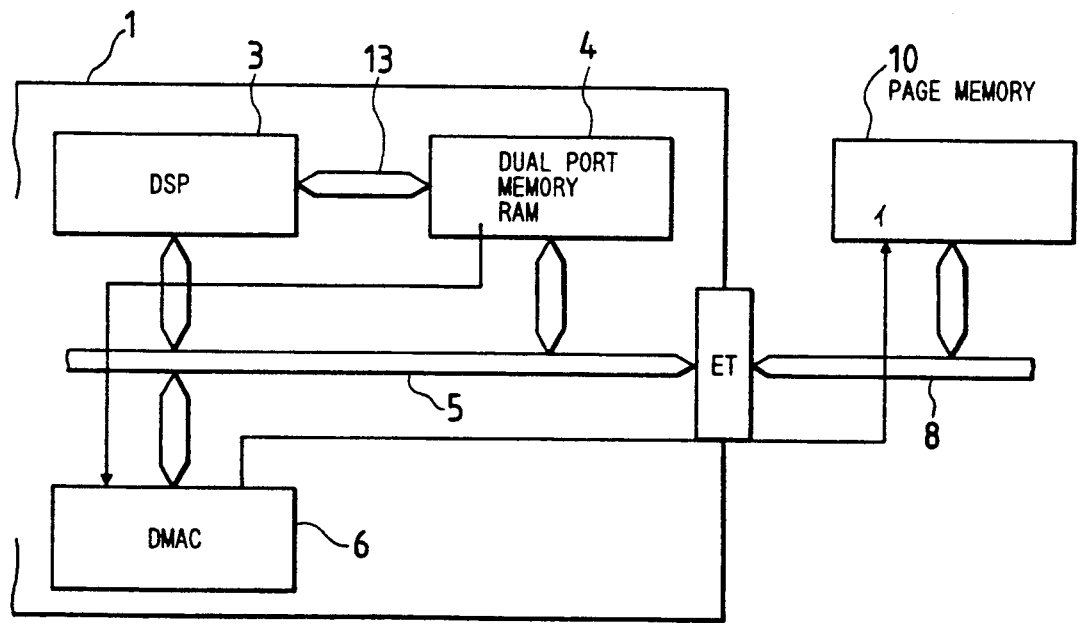

FIGS. 3A and 3E illustrate successive steps of operation of the outline font drawing system of FIG. 2.

When the CPU 2 attempts to draw a required outline font into the page memory 10, outline font data constituting the outline font are transmitted from the external memory 9 to the DSP 3 by the DMAC 6 as shown in FIG. 3A. In this instance, the DSP 3 itself may alternatively fetch the outline font data directly from the memory 9. Where the DMAC 6 is utilized, the CPU 2 initializes the DMAC 6 in advance so that an address of the memory 9 from which data are to be transferred and a number of words to be transferred are stored into the DMAC 6. Conversely, where the DSP 3 itself access the memory 9, the CPU 2 provides the DSP 3 with an outline font developing instruction including information to designate an outline font to be developed.

Subsequently, the DSP 3 takes in the outline font data as illustrated in FIG. 3B, and executes a series of calculations for calculation and/or coordinate transformation of free curves constituting the outline font in accordance with a program of itself. Then, the DSP 3 develops the font in the dual port memory 4 in accordance with results of the calculations as illustrated in FIG. 3C. The data of the developed font will constitute a dot pattern. In this instance, painting out of the inside of the outline font may possibly be executed by the DSP 3. Painting out may also be executed later by the drawing/displaying processor 11.

The outline font developed in the dual port memory 4 is transmitted to the external page memory 10 by the DMAC 6, having a bit block transfer function as illustrated in FIG. 3D. Finally, a document composed of a character or characters transferred to the page memory 10 and/or a figure of figures drawn by the drawing/displaying processor 11 is transmitted as a video signal from the page memory 10 the LBP printer engine 12 by the drawing/displaying processor 11, as illustrated in FIG. 3E, and is printed by the LBP printer engine 12.

Here, during a period of time of operation illustrated between FIGS. 3A and 3E, the CPU 2 does not participate in the development/drawing operation of an outline font except initialization of the DSP 3 and the DMAC 6. During this period of time, the CPU 2 can execute communication with a host computer (not shown) outside the LBP or decode a page describing language such as a postscript, transmitted from the host computer. The operation efficiency of the system is improved.

It is to be noted that the DSP 3 can be used to execute coordinate transformation involved in the decoding of a page describing language by the CPU 2.

Form of Development and Transfer of Outline Font

Figure 5A:
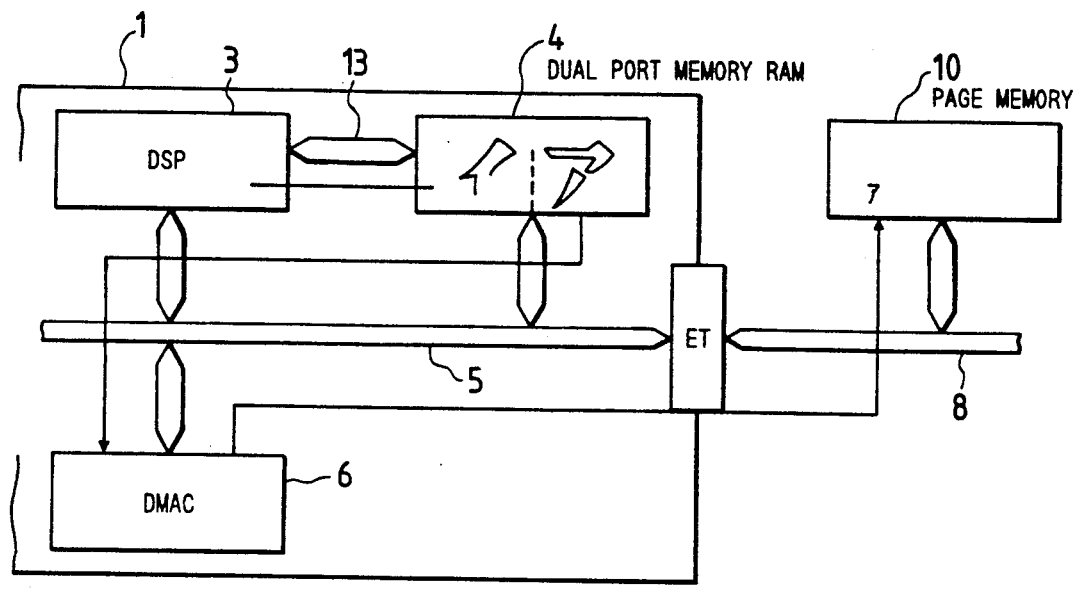
FIGS. 5A and 5B are representations illustrating another form of development and transfer of an outline font.
Figure 5B:
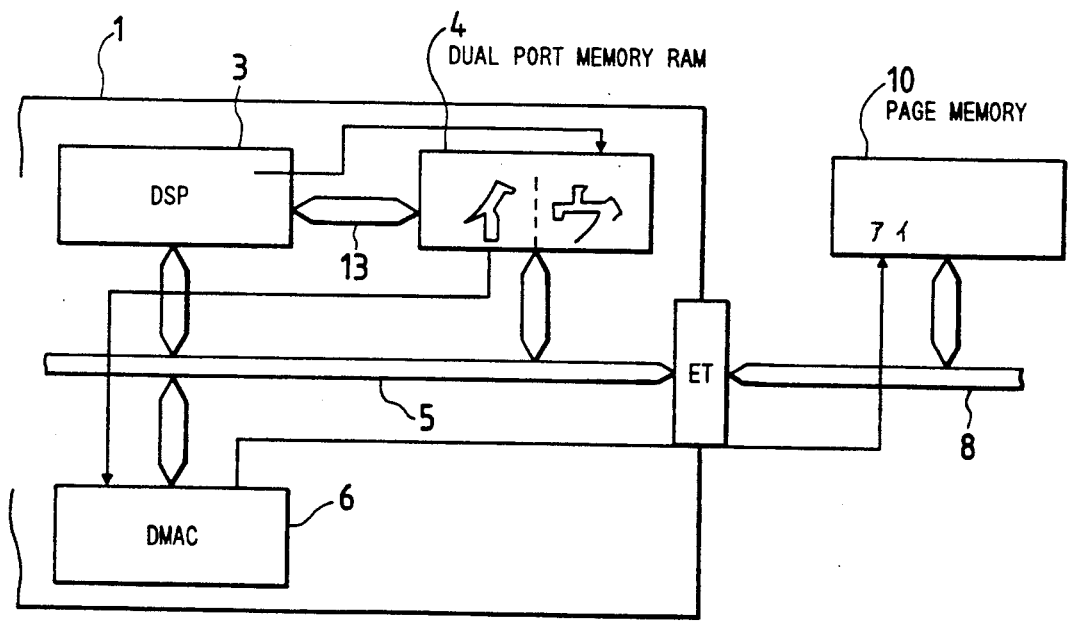

Another form of development and transfer of an outline font may be employed wherein the dual port memory 4 is divided into two areas as seen in FIGS. 5A and 5B. While a font is being developed in one of the areas, the DMAC 6 bit block transfers another font already developed in the other area into the page memory 10. Where the latter method is employed, the DSP 3 and the DMAC 6 can operate simultaneously. Consequently, the efficiency in drawing an outline font is higher as a whole than the former system and method.

Connection between DSP and Dual Port Memory

Referring now to FIG. 6, dual port memory 4 is connected to the DSP 3 by way of a data buffer 20 and an address pointer 19 such as an address register provided in the DSP 3. Though not particularly limited, the DSP 3 shown in FIG. 6 includes an executing section which can execute an addition, a multiplication, or an accumulation at high speed; an arithmetic and logic unit 18 which includes a logical unit in addition to a multiplier and an accumulator; a plurality of registers 17, and a data memory 16 which is utilized as a working area. The arithmetic and logic unit 18, registers 17 and data memory 16 are interconnected by an internal bus 21 of the DSP 3. The DSP 3 further includes a program memory 14 such as a micro ROM in which a data processing algorithm is described, and a micro-sequencer 15 for successively reading instructions from the program memory 14 to control operation of the executing section of the DSP 3. Instructions of the DSP 3 for accessing the data memory 16 are contained in the program memory 14. Such instructions include an address designating field for designating an address of the data member 16 to be accessed. Where no command for directly accessing the dual port memory 4, provided externally of the DSP 3, is contained in the program memory 14, an address pointer 19 and data buffer 20, as shown in FIG. 6, may be provided in the DSP 3 for connection of the dual port memory 4. Consequently, with respect to the DSP 3, access to the dual port memory 4 is equivalent to register access to the address pointer 19 and the data buffer 20. Accordingly, where the DSP 3 is constructed to make use of an existing DSP module, it is possible to connect the dual port memory to the same without significantly changing the contents of the program memory.

Where instructions for directly accessing the dual port memory 4 are involved in the program memory 14, the program memory 14 can be connected directly to the internal bus 21 of the DSP 3 as shown in FIG. 7. In particular, a similar connection to that of the data memory 16 of FIG. 6 is provided to the dual port memory 14. In this instance, contents of a program memory in an existing DSP module must be made comparatively large. However, since no registers, such as the address pointer 19 or the data buffer 20, need be interposed, access to the dual port memory 4 by the DSP 3 can be executed at a high speed.

Further, FIGS. 6 and 7 show the DSP including a data register DT-REG, a status register ST-REG, a fetch address register FH-REG, an increment circuit INC, and a bus cycle generator BSG. Each of the data register DT-REG, the status register ST-REG, and the fetch address register FH-REG is allocated to a predetermined address in the addresses of the CPU. The status register ST-REG holds data for indicating an internal status of the DSP. Therefore, the CPU can determine the internal status of the DSP by accessing the predetermined address allocated to the status register ST-REG.

The bus cycle generator BSG receives internal address signals from the fetch address register FH-REG and generates address signals on the basis of the internal address signal. In addition, the bus cycle generator BSG generates bus control signals.

In FIGS. 6 and 7, PT is an interface port. The DSP transmits a data transfer request signal $\overline{DREQ}$ for requesting the data transfer operation to the DMAC and receives a data acknowledge signal $\overline{DACK}$ for indicating the completion of the data transfer operation from the DMAC, by using this interface port PT.

Dual Port Memory

Figure 8:
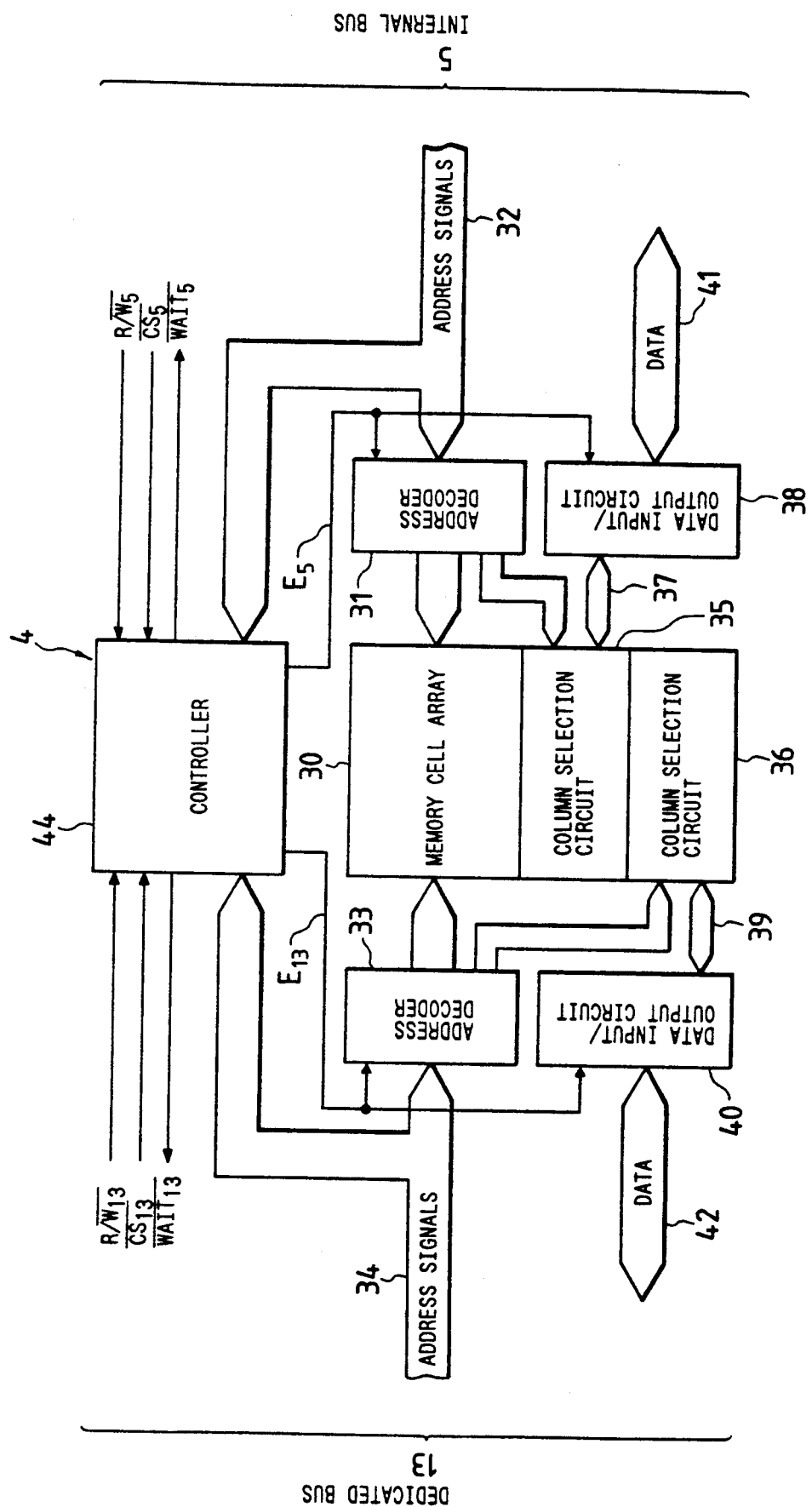
FIG. 8 is a block diagram showing a dual port memory accessible in parallel fashion.

Referring now to FIG. 8, a dual port memory having two perfectly independent access ports is shown. The dual port memory 4 has a memory cell array 30 in which a plurality of memory cells (not shown) are arranged in a matrix. Each of the memory cells have two sets of memory cell selecting terminals and data input/output terminals. One of the selecting terminals of each memory cell is connected to a word line which is driven to a selection level in accordance with a decoded result of an address signal 32 by an address decoder 31. The other terminal is coupled to another word line which is driven to a selection level in accordance with a decoded result of another address signal 34 by another address decoder 33. On the other hand, one of the data input/output terminals of each memory cell is coupled to a bit line (not shown) connected to a column selection circuit 35. Circuit 35 is controlled to switch in accordance with a decoded result of the address signal 32 by the address decoder 31. The other data input/output terminal is coupled to another bit line (not shown) connected to another column selection circuit 36. Circuit 36 is controlled to switch in accordance with a decoded result of the address signal 34 by the address decoder 33. The column selecting circuit 35 is connected to a data input/output circuit 38 by way of a common data line 37. The other column selection circuit 36 is connected to another data input/output circuit 40 by way of another common data line 39.

The address signal 32 is transmitted from the CPU 2 or the DMAC 6 by way of the internal bus 5. The data input/output circuit 38 delivers data 41 from and to those circuits. Meanwhile, the address signal 34 is transmitted from the DSP 3 by way of the dedicated bus 13. The other data input/output circuit 40 delivers data from and to the DSP 3.

The dual port memory shown in FIG. 8 can be read from and written into from the internal bus 5 side and the dedicated bus 13 side independent of each other.

However, in a case where the same address of the dual port memory is accessed by both sides simultaneously writing into one of the two sides is executed with priority. Priority control is executed by a controller 44 which has a function as an arbiter. The controller 44 receives an address signal 32, a read/write signal R/W$_5$, a chip select signal CS$_5$ transmitted by way of the internal bus 5, an address signal 34, read/write signal R/W$_{13}$, chip select signal CS$_{13}$, and chip select signal CS$_{13}$ transmitted thereto by way of the dedicated bus 13. The controller 44 executes priority control, operation mode, and timing controls in accordance with the states of the signals received. The controller 44 produces, as control signals regarding priority control, wait signals WAIT$_5$ and WAIT$_{13}$ and enable signals E$_5$ and E$_{13}$. The wait signal WAIT$_5$ or WAIT$_{13}$ is regarded, depending upon an assert state thereof, as a signal of instructing stretching in time of a cycle of access to the dual port memory 4 by the DSP 3, CPU 2 or DMAC 6. Meanwhile, the enable signal E$_5$ or E$_{13}$ controls, depending upon an assert state thereof, the enabling at the address decoder 31 and data input/output circuit 38 or the address decoder 33 and the data input/output circuit 40, respectively. In the case where the same address of the dual port memory 4 is simultaneously accessed for writing from the DSP 3 and the CPU 2 or DMAC 6, the controller 44 produces a control signal which negates the wait signal WAIT$_5$, asserts the wait signal WAIT$_{13}$, asserts the enable signal E$_5$ and negates the enable signal E$_{13}$. The control signal is produced in accordance with a predetermined priority control logic to first permit the write access from the internal bus 5 side. In any other instance, the controller 44 permits parallel access from the two sides.

Employment of the dual port memory 4, which permits independent parallel access, is particularly effective in the form of development and transfer of an outline font described hereinabove with reference to FIGS. 5A and 5B.

It is to be noted that the read/write signal R/W$_5$ or R/W$_{13}$ is a control signal indicating whether a reading operation or a writing operation of the dual port memory 4 is instructed by the CPU 2, DSP 3 or DMAC 6. The chip select signal CS$_5$ or CS$_{13}$ is a signal indicating whether or not the dual port memory 4 is selected by the CPU 2, DSP 3 or DMAC 6.

Figure 9:
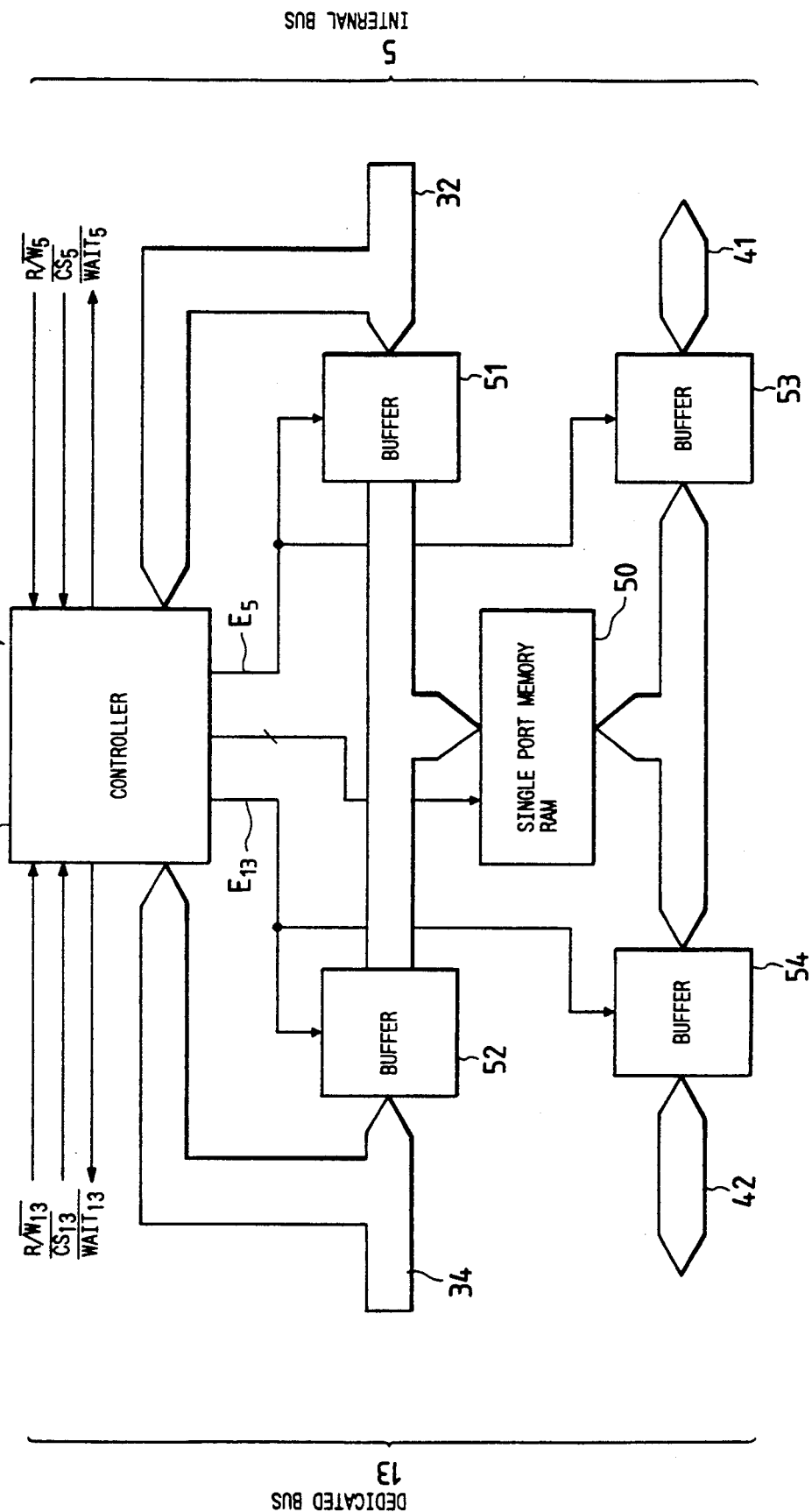
FIG. 9 is a block diagram of a dual port memory in which a single port memory is employed.

Referring now to FIG. 9, a dual port memory 4, having a structure wherein a single port memory 50 is included is shown. In order to enable access from both internal buses, 5 and 13, using the single port memory 50, output terminals of a pair of buffers 51 and 52 are connected in common to a single address input circuit of the single port memory 50. The aforementioned address signal 32 is supplied to input terminals of the buffer 51. The aforementioned address signal 34 is supplied to input terminals of the other buffer 52. Further, input/output terminals of a buffer 53, used for delivering data 41 and input/output terminals of another buffer 44 for delivering data 42, are also connected in common to a single data input/output circuit of the single port memory 50. Since parallel access from both 5 and 13 is impossible because the single port memory 50 is appropriated, an arbitration logic for avoiding possible interference is contained in a controller 55. The controller 55 forms such wait signals WAIT$_5$ and WAIT$_{13}$ and enable signals E$_5$ and E$_{13}$, as described above, in accordance with the arbitration logic. Here, the wait signals WAIT$_5$ and WAIT$_{13}$ and the buffers 51 and 54 are controlled so as to permit access from only one of the buses 5 and 13 to any instance.

The dual port memory 4, in which a single port memory 50 is included, does not accept parallel access from the two ports. However, the structure of the memory itself is simplified with regard to the structure of word lines or bit lines to memory cells as well as to the numbers of address decoders. Input/output circuits or column selection circuits are also simplified. Consequently, the dual port memory can be produced at a reduced cost.

Multi-Chip Computer

Figure 10:
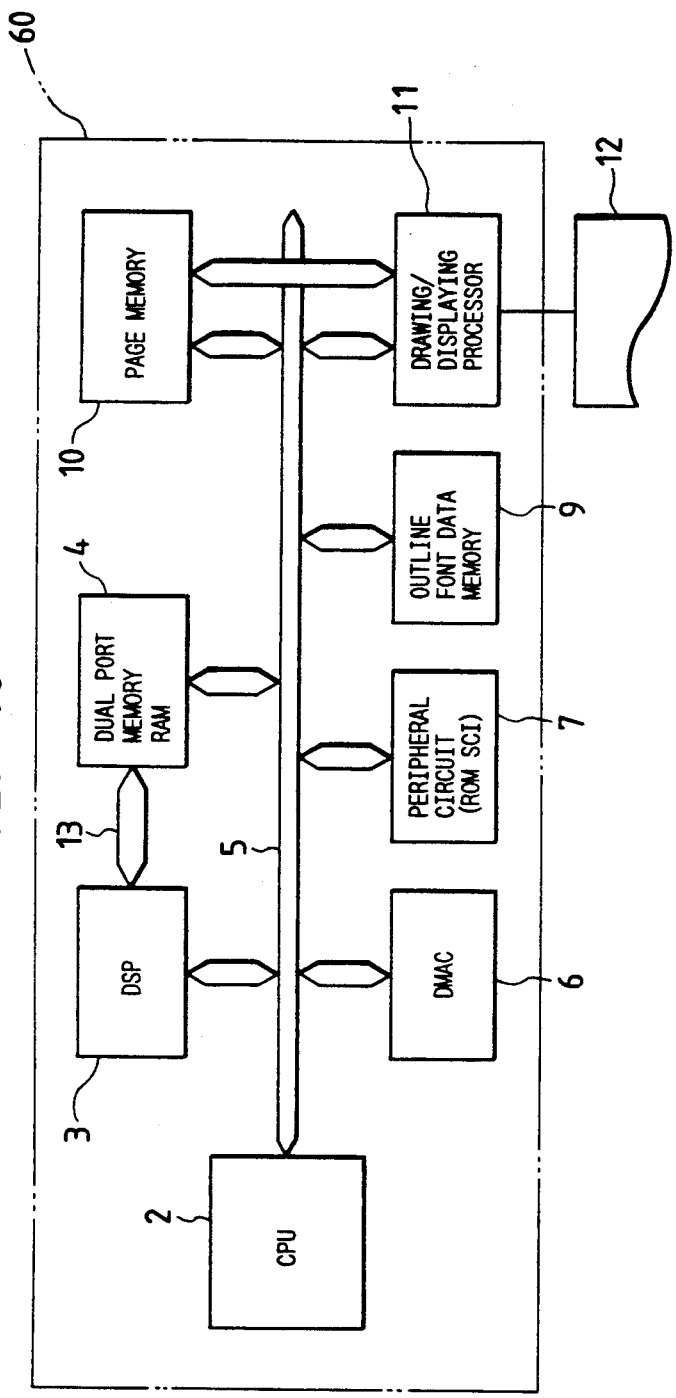
FIG. 10 is a block diagram of a system in which the system of FIG. 2 is formed on a circuit board.

The CPU 2, DSP 3, dual port memory 4, DMAC 6, and peripheral circuit 7 are not limited to formation on a single semiconductor substrate. They may be formed into a multi-chip computer by mounting them on a single circuit board 60 such as a printed circuit board as shown in FIG. 10. In this instance, the outline font data memory 9, page memory 10, and drawing/displaying processor 11 may be mounted on the circuit board 60. Also, in multi-chip construction, if the access speed to the dual port memory 4 can be increased sufficiently, then a processing speed comparable to the processing speed of the system constructed on a single semiconductor can be attained.

Particularly, if all components are formed into a multi-chip device on a board to construct a required data processing device, then an anticipated data processing system can be obtained readily without requiring time and labor for development of a new single chip microcomputer 1 (FIG. 1).

Construction of DSP into a Multi-Processor

A plurality of DSPs 3 may be used to form the DSPs as multi-processors.

Figure 12A:
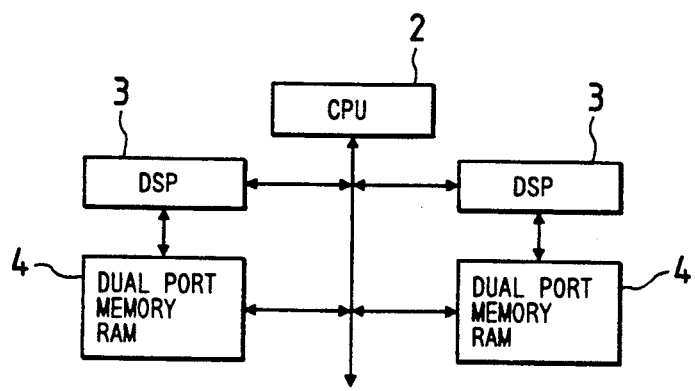
FIGS. 12A, 12B and 12C are schematic block diagrams showing a system wherein a plurality of digital signal processors are utilized as multi-processors.

Referring to FIG. 12A, a system wherein two sets of DSPs 3 and dual port memories 4 are provided for a single CPU 2 is shown. With such construction, the processing faculty in development of a font is improved substantially.

Figure 12B:
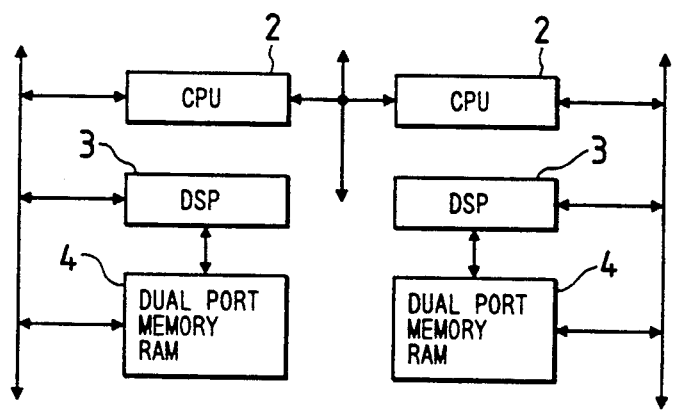

FIG. 12B shows another system wherein a dedicated DSP 3 and a dedicated dual port memory 4 are provided for each of two CPUs 2. With this construction, in addition to improvement in processing faculty in development of a font, a burden to each CPU 2 in the development or drawing of a font is reduced, compared with the system shown in FIG. 12A.

Figure 12C:
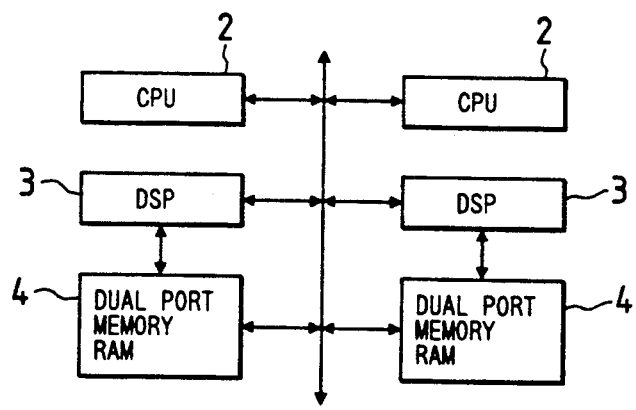

FIG. 12C shows a further system wherein two sets of DSPs 3 and dual port memories 4 are provided commonly for two CPUs 2. Such construction allows ready improvement in operation efficiency while providing a versatility in system controlling operation of the CPUs 2, compared with the system of FIG. 12B.

While in the individual embodiments described above an address bus, a control signal bus and a data bus are each referred to as a bus, a bus may be any bus, shown in FIGS. 8 and 9.

Figure 13:
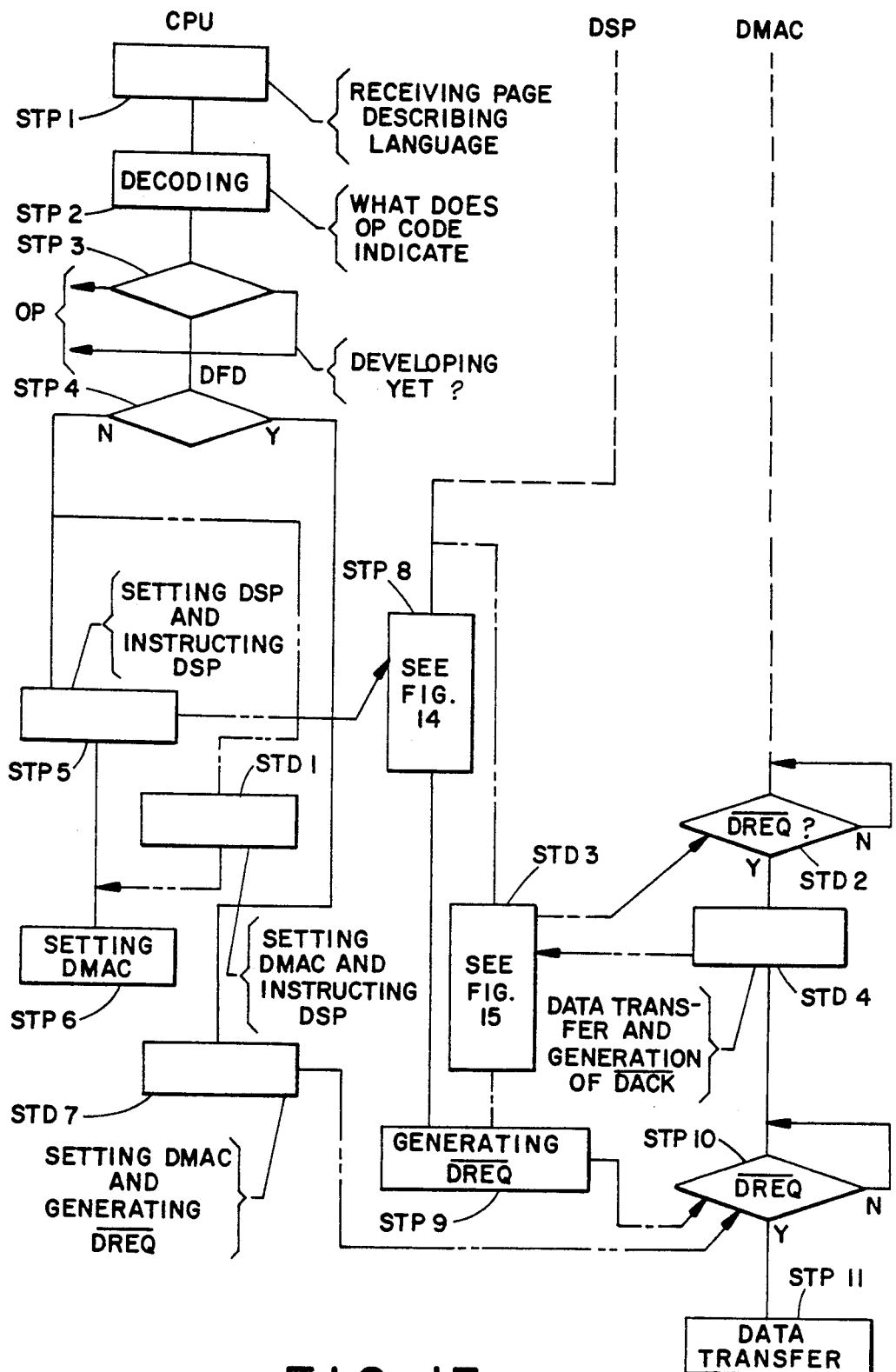
FIGS. 13-15 show a method for developing the outline font data into a pattern of dots.
Figure 14:
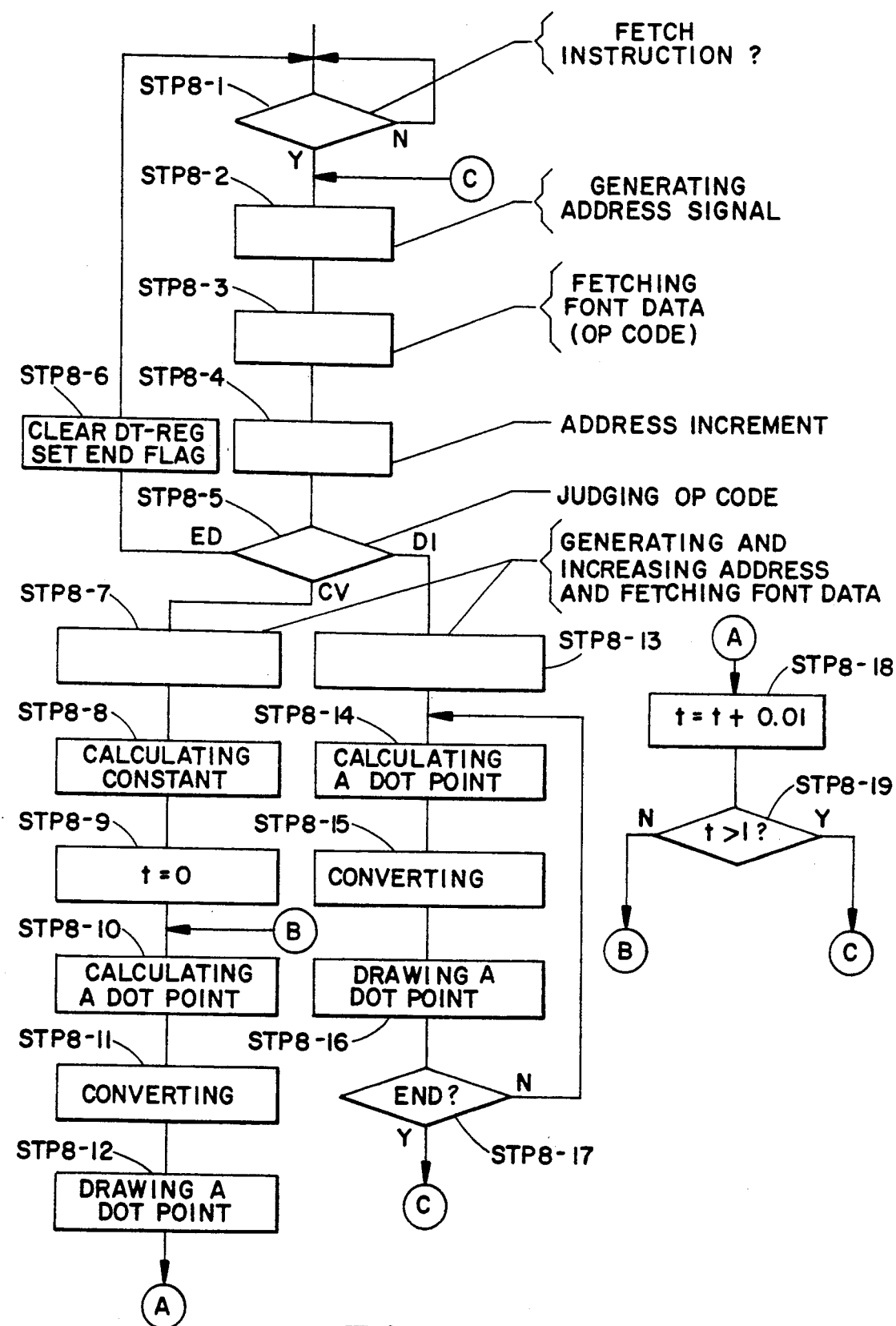
Figure 15:
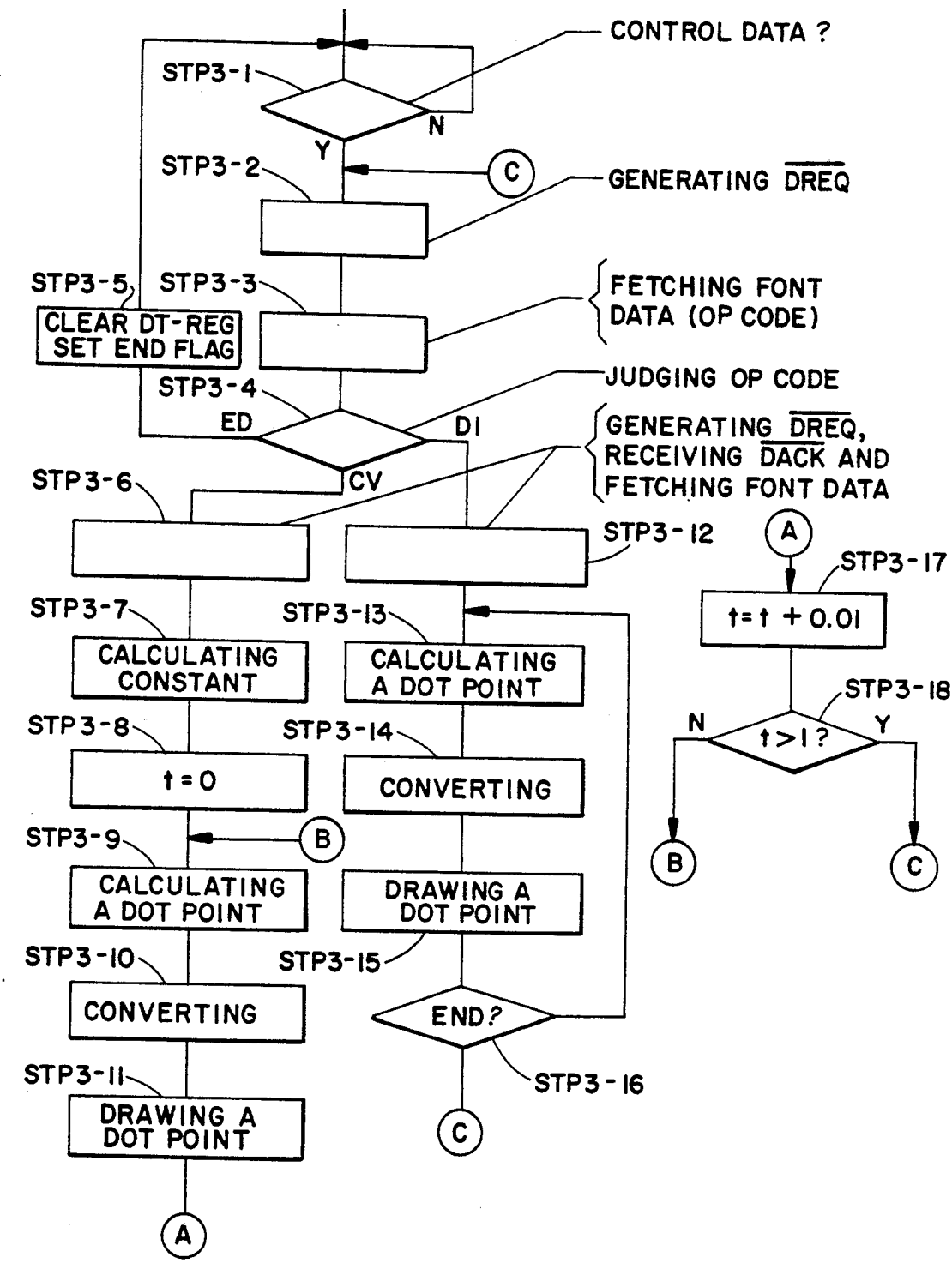

In FIGS. 13-15, an example of the method for developing an outline font data into a pattern of dots is shown. This method is applied to the single chip microcomputer shown in FIG. 2.

In FIG. 13, the steps STP1-STP7 and STD 1 are executed by the CPU. The steps STP 8, STP 9 and STD 3 are executed by the DSP. The steps STP 10, STP 11, STD 2, and STD 4 are executed by the DMAC. In the case when the DSP itself fetches the font data from outline font data memory 9, the above steps STP 1-STP 11 are executed. In the case when the DMAC transfers font data from font data memory 9 to the DSP, the above STP 1-STP 4, STP 6, STP 7, STP 9-STP 11 and STD 1-STD 4 are executed. That is, the steps STD 1-STD 4 are executed instead of the steps STP 5 and STP 8.

Figure 16:
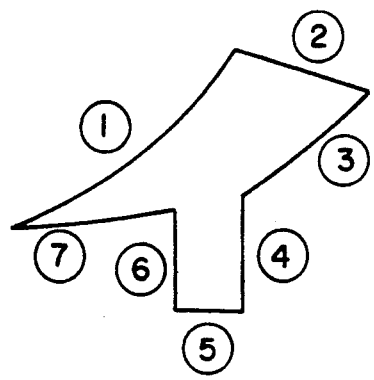
FIG. 16 shows a font used to explain the font data development.

FIG. 16 shows font "τ". This FIGURE is used for explaining the font data development.

Figure 17A:
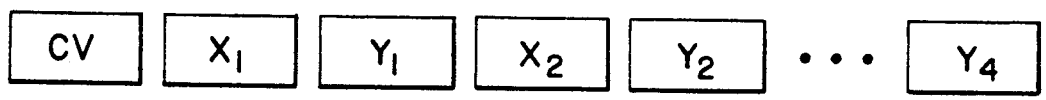
FIG. 17(A) shows the format of the font data representing a curved line.
Figure 17B:
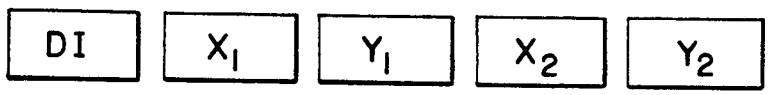
FIG. 17(B) shows the format of the font data representing a straight line.
Figure 17C:
FIG. 17(C), shows the format of the data which indicates the end of font data.

FIGS. 17(A)-17(C) show the format of the outline font data. In FIG. 17(A), the format of a font data representing a curved line is shown. In FIG. 17(B), the format of a font data representing a straight line is shown. FIG. 17(C) shows the format of data for indicating the end of a font data.

Figure 18:
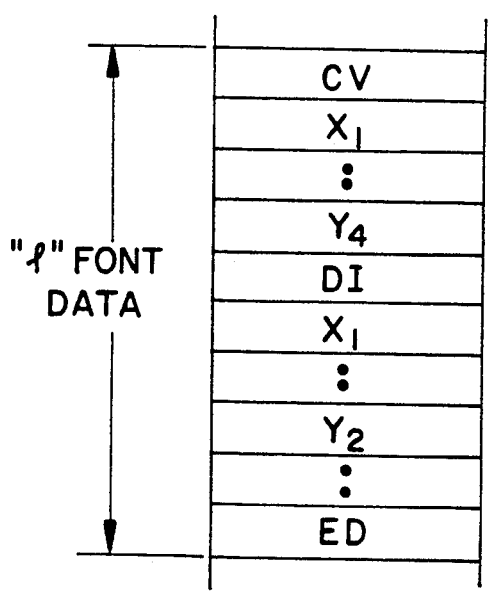
FIG. 18 shows the format of font data representing the font "τ"

FIG. 18 shows a format of the font data for representing the font "τ". The outline font data corresponding to the font "τ" includes seven (7) font data items and one (1) control item data for indicating the end of outline font data. That is, three (3) font data items representing the curved lines 1, 3, and 7; four font data items representing the straight lines 2, 4, 5, and 6; and one (1) control data items (see FIG. 16) correspond to outline font data.

In the present embodiment, a curved line is represented by a Bezier curve. Therefore, a profile of a curved line is defined on the basis of four (4) control points. As you can see from FIG. 17(A), therefore, the font data for representing a curved line have an operation code CV for indicating that this font data is a curved line, and the four (4) control points as the operand data. Please note that one (1) control point is represented by one (1) X-coordinate and one (1) Y-coordinate. Accordingly, curve font data has four X-coordinates (X1-X4) and four (4) Y-coordinates (Y1-Y4).

As you can see from FIG. 17(B), on the other hand, the font data for representing a straight line has an operation code DI for indicating that this font data is a straight line, and the starting and end point data. In this case, the starting point is represented by the coordinate data (X1, Y1), and the end point is represented by the coordinate data (X2, Y2).

Please note that each of the operation codes CV and DI includes a field for indicating the number of data items to be fetched as the operand data. In the operation code CV, a field for indicating eight (8) data items (X1, Y1, ... X4, Y4) is included. The operation code DI includes the field for indicating four (4) data items (X1, Y1, X2, Y2).

The control data shown in FIG. 17(C) represents the end of the outline font data corresponding to one font. Therefore, this control data has an operation code ED for indicating the end of the outline font data.

Calculation for Development into a Dot Pattern

FIG. 20 shows a calculation for developing the font data of a curved line into a dot pattern. As shown in the FIGURE, constant values a-f are obtained by calculating control points CP1-CP4 (see step 1).

Next, a plurality of dot points for constructing the dot pattern are calculated by using f(t) in step 2. For example, by varying the variable (t) at intervals of 0.01 from "0" (zero) to "1" (one), the dot points according to variable (t) are obtained by the numerical expression f(t) shown in step 2.

The calculation for developing the font data of a straight line into a dot pattern is executed, for example, by interpolation. A plurality of dot points for constructing this dot pattern are obtained by interpolating between the starting point and the end point.

The Program Memory 14 Shown in FIGS. 6 and 7

Figure 19:
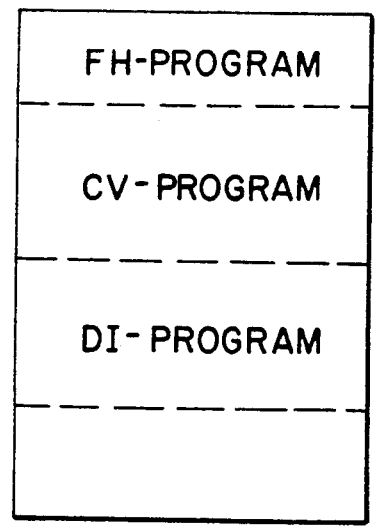
FIG. 19 shows the contents of program memory 14.

FIG. 19 shows the contents of the program memory 14. In this FIGURE, CV-PROGRAM indicates a program for executing the calculation for development of the font data concerning a curved line into a dot pattern. DI-PROGRAM indicates a program for executing the calculation for development of the font data concerning a straight line into a dot pattern.

In the present embodiment, FH-PROGRAM in FIG. 19 includes six (6) control programs. The first control program in the control programs is a check program for determining whether control data for instructing a fetch operation to the DSP is written in the data register DT-REG by the CPU. The second control program is a fetch program for fetching the outline font data from the outline font data memory 9 into the data register DT-REG. The third control program is a determination program for determining the next program to be executed on the basis of the operation code of the font data fetched in the data register DT-REG. If the operation code is CV, the CV-PROGRAM is executed. If the operation code is DI, the DI-PROGRAM is executed. If the operation code is EN, the fourth control program is executed. The fourth control program is a clear program for resetting the contents of the data register DT-REG and for setting an end flag. The fifth control program is an access program for providing the contents of the fetch address register FH-REG to the address bus. The sixth control program is an increment program for making +1 increment for the fetch address register FH-REG.

When the DSP is put on the initial stage or is reset, the DSP executes the first control program. Therefore, the DSP waits in the execution of the first control program until the CPU writes the control data for instructing the fetch operation into the data register DT-REG.

Explanation of the Font Data Algorithm

In the case when the DSP fetches the font data from outline font data memory 9, please refer to FIGS. 13, 14, 6, and 2.

In step STP 1 of FIG. 13, the CPU 2 receives a page describing language from a host computer. The received page describing language is decoded by the CPU 2 in step STP 2. In step STP 3, the CPU 2 decides which step is to be executed in accordance with the result of decoding in the step STP 2. If the received page describing language indicates that the process (DFD) for developing the outline font data is needed, step STP 4 is selected as the next step to be executed. On the other hand, if the received page describing language indicates that the other process (OP) is needed, the CPU executes steps corresponding to this other process.

In step STP 4, the CPU 2 determines whether an outline font data item which is indicated by the received page describing language has been already developed in the dual port memory 4. The CPU 2 checks the contents of the working area 2A to make this determination. If the corresponding outline font data has already been developed (Y), step STP 7 is executed by the CPU 2. On the other hand, if the corresponding outline font data has not been developed (N), step STP 5 is executed.

In step STP 5, the CPU 2 writes an address data for indicating an address in the outline font data memory 9, the address in which the outline font data indicated by the received page describing language is stored, into the fetch address register FH-REG (see FIG. 6). In addition, the CPU 2 writes the control data for instructing the fetch operation to the DSP into the data register DT-REG (see FIG. 6). Please note that the above address data is a data for indicating a start address of the stored outline font data. For example, the address data indicates the address in which the operation code CV in the outline font data corresponding to the font "τ" is stored (see FIG. 18).

The CPU 2 executes step STP 6 after step STP 5. In step STP 6, the CPU 2 sets address data for indicating an address in the dual port memory 4, the address which stores the developed outline font data, as a source address data in the DMAC. CPU 2 also sets address data for indicating an address in the page memory 10, the address which will store the developed outline font data, as a destination address in the DMAC. Furthermore, the CPU 2 sets the number of transferred bytes (or words) to be transmitted by the DMAC into the DMAC. Furthermore, the CPU 2 writes predetermined data for indicating that a predetermined font (e.g. "τ") has been developed on the dual port memory into the working area.

If CPU 2 determines (Y) in step STP 4, step STP 7 is executed. In step STP 7, the CPU 2 sets the source address data, the destination address data, and the number of the transferred bytes into the DMAC. Next, CPU 2 provides the data transfer request signal $\overline{DREQ}$ to the DMAC.

This data transfer request signal $\overline{DREQ}$ is detected by the DMAC 6 in step STP 10, and the DMAC 6 starts a data transfer operation in accordance with the set source, destination address data, and the number of the transferred bytes (in step 11).

The DSP 3 executes the steps shown in FIG. 14 and step STP 9, in response to the above control data generated by the CPU in step STP 5. Please note that these steps are defined by the program memory 14 is the DSP.

The DSP determines whether the control data for instructing the fetch operation is written into the data register DT-REG (in step STP 8-1). This determination is executed by comparing the contents of the data register DT-REQ with a code pattern corresponding to the above control data which has already been stored in the data memory 16 by the ALU 18.

If the above control data is not written into the data register DT-REG (N), the step STP 8-1 is executed again. If the above control data is written into the data register DT-REG (Y), step STP 8-2 is executed subsequent to step STP 8-1.

In step STP 8-2, the DSP provides the address data written in the fetch address register FH-REG, the address data which has already been written in the step STP 5, to the outline font data memory 9 via the address bus. The outline font data memory 9 provides the font data (the operation code) indicated by the address data to the data bus. The DSP fetches the font data (the operation code) from the data bus in the step STP 8-3.

Next, the contents of the fetch address register FH-REG is increased by the increment circuit INC in step STP 8-4.

In step STP 8-5, the DSP determines the contents of the operation code fetched in the data register DT-REG. That is, a next step to be executed is determined in accordance with the contents of this operation code.

If the operation code is CV, step STP 8-7 is executed. In step STP 8-7, the address data which has already increased in step STP 8-4 is applied to the outline font data memory 9 via the address bus. The font data indicated by this address data from the outline font memory 9 is applied and fetched into the data register DT-REG. Furthermore, the font data fetched into the register DT-REG is written into the data memory 16, the contents of the fetched address register FH-REG is again increased by the increment circuit INC, and the font data indicated by this new address data from the memory 9 is fetched into the register DT-REG and is written into the data memory 16. The DSP executes the increment operation, the fetch operation, and writing operation so that all the font data indicated by the field of the operation code in the number can be written into the data memory 16. That is, the DSP executes the increment, fetch, and writing operations until eight (8) font data items (representing 4 control points) are stored in the data memory 16. Furthermore, the DSP executes an additional increment operation in order to generate new address data for indicating the font data items (the operation code) to be fetched.

In step STP 8-8, the calculations shown in step 1 of FIG. 20 are executed by using four (4) control points stored in the data memory 16. As a result, the constant values a-f are obtained.

In step STP 8-10, the calculations shown in step 2 of FIG. 20 are executed in the state where "t=0". As a result, the X- and Y- coordinate values (X- and Y- address) of the dot point at the stat when "t-0" are obtained. The obtained X- and Y- addresses are converted so as to suit the address range of the dual port memory 4 (in step STP 8-11). In step STP 8-12, the DSP draws a dot point at an address which was obtained by the convert step STP 8-11 of the dual port memory 4.

Next, step STP 8-18 is executed by the DSP. In this step, the variable data "t" is increased. For example, the calculation "t=t+0.01" is executed. Thereafter, the DSP determines whether the variable data "t" is less than "1" or not. If the variable "t" is less than "1" (N), step STP 8-10 is executed again. As a result, the next dot point is drawn in the dual port memory 4. The DSP repeats steps STP 8-10–STP 8-12 and STP 8-18–STP 8-19 while the variable data "t" is less than "1". As a result of these operations, the font data concerning a curved line is developed into a dot pattern on the dual port memory.

If the variable data "t" is more than "1" (Y), step STP 8-2 is executed. As a result, a new operation code which is indicated by the new address data generated in step STP 8-7 is fetched in step STP 8-4 and is judged in step STP 8-5.

If the operation code fetched in step STP 8-4 is DI, step 8-13 is executed. In step STP 8-13, the DSP executes the operations similar to step STP 8-7. As a result, the DST fetches the font data (X1, Y1, X2, Y2) concerning the starting and end points from the outline font data memory and writes the above font data into the data memory 16.

In steps STP 8-14, the DSP obtains a point between the starting point and the end point by interpolation. Thereafter, the DSP executes steps STP 8-15 and STP 8-16 which are similar to steps 8-11 and 8-12. As a result, the DSP draws a dot point at an address, according to the X- and Y- addresses of the point obtained in step STP 8-14, in the dual port memory.

The DSP determines whether the point obtained in step STP 8-14 reaches to the end point (or starting point) or not. If the obtained point does not reach to the end point (N), the DSP repeats steps STP 8-14–8-17. As a result, the DSP draws a dot pattern represented by the font data concerning a straight line on the dual port memory. If the obtained point is over the end point (Y), steps STP 8-2–STP 8-5 are executed.

If a new operation code fetched in step STP 8-4 is ED, step STP 8-6 is executed. In step 8-6, the DSP clears the data register DT-REG. In the present embodiment, the DSP sets an end flag for indicating completion of the development operation concerning to the font in this step. Next, DSP executes step STP 8-1 again.

In response to the set flag and end flag, the interface port PT generates the data transfer request signal $\overline{DREQ}$ in step STP 9. The DMAC detects this request signal $\overline{DREQ}$ and transmits the dot pattern developed on the dual port memory to the page memory 10 in step STP 11.

In the case when the DSP shown in FIG. 7 is used instead of the DSP in FIG. 6, the dual port memory 4 may be used instead of the above data memory 16.

In the case when the DMAC transmits the outline font data to the DSP from the outline font memory, please see FIGS. 13, 15, 6(7), and 2.

In this case, steps STD 1 and STD 3 are executed instead of steps STP 5 and STP 8.

In step STD 1, the CPU 2 sets an address data for indicating an address, in which the outline font data indicated by the received page describing language is stored, as a source address to the DMAC, and sets predetermined address data for indicating the data register DT-REG as a destination address to the DMAC. The CPU also sets the number of transferred bytes (or words) to be transmitted by the DMAC to the DMAC in this step. In addition, the CPU 2 writes control data for instructing the DSP to fetch the font data into the data register DT-REG.

The DSP determines whether the above control data is written into the data register DT-REG in step STD 3-1. If the above control data is not written into the register DT-REG(N), the DSP executes step STD 3-1 again. On the other hand, if the above control data is written into the register DT-REG(Y), the DSP executes step STD 3-2.

In step STD 3-2, the DSP generates the data request signal $\overline{DREQ}$. This request signal $\overline{DREQ}$ is detected by the DMAC in step STD 2, and the DMAC transmits the font data to the data register DT-REG and generates the acknowledge signal $\overline{DACK}$ in step STD 4. In step STD 303, the DSP fetches the font data (the operation code) from the outline font data memory, in response to the acknowledge signal $\overline{DACK}$.

Steps STD 3-4–STD 3-5, STD 3-7–STD 3-11, and STD 3-13–STD 3-18 are similar to steps STP 8-5–STP 8-6, STP 8-8–STP 8-12, and STP 8-14–STP 8-19 shown in FIG. 14. Therefore, an explanation of these steps is omitted.

In step STD 3-6, the DSP generates the data request signal $\overline{DREQ}$ and fetches the font data on the data bus into the data register DT-REG in response to the acknowledge signal $\overline{DACK}$. Furthermore, the DST writes the font data (the control point) to the data memory. As a result, the font data items concerning four (4) control points are written into the data memory.

Step STD 3-12 is similar to step STD 3-6. That is, the DSP generates the request signal $\overline{DREQ}$ and fetches the font data concerning the starting and end points into the register DT-REG in response to the acknowledge signal DACK. The DSP writes the font data fetched in the register DT-REG into the data memory. As a result, the font data concerning the starting and end points are written into the data memory.

In the case when the DSP shown in FIG. 7 is used instead of the DSP of FIG. 5, the dual port memory 4 may be used instead of the above data memory 16.

Features of the Invention

According to the various embodiments described hereinabove, the following actions can be attained.

First, the DSP 3 includes an architecture for executing a large amount of calculations at a high speed. This architecture includes a multiplier and an adder and executes parallel pipe line processing of instruction fetch, data transfer and calculation due to separation of transfer systems for data and instruction. Consequently, the DSP 3 executes required calculations at a higher speed than in a system which employs a co-processor such as an FPU. Employment of the DSP 3 and CPU 2 attains outline font drawing at a higher speed than a data processing system which includes only a CPU or a CPU and a co-processor such an FPU.

Second, the DSP 3 itself executes a series of steps of data processing, such as font development, using the data processing algorithm of the program memory 14 in accordance with an instruction of the CPU 2 and in a parallel relationship to data processing operation of the CPU 2. In other words, the DSP 3 has a control procedure different from an instruction executing procedure wherein co-processor instructions are commonly stored with instructions of the CPU 2. Accordingly, the DSP 3 can proceed with data processing independent of the operation of the CPU 2. Consequently, when the DSP 3 is executing data processing, such as a floating point calculation, the CPU 2 can proceed with independent or different processing. In this manner, the DSP 3 can execute a large amount of calculations at a high speed without imposing a great burden upon the CPU 2 and without restraining operation of the CPU 2 significantly.

Third, the dual port memory 4, which can be accessed from both CPU 2 and DSP 3 by way of different buses, can execute storage of results of calculations by the DSP 3, such as the development of an outline font, into the RAM by way of dedicated a bus 13, which is separate from the common bus 5 to which the CPU 2 is coupled. Consequently, perfection of parallel operation of the CPU 2 and the DSP 3 is assured. Not only the operational efficiency of the DSP 3 in data processing, such as development of an outline font, but also the operation efficiency of the entire system can be increased.

Fourth, where the dual port memory 4 is utilized as a font cache memory, font development need not be executed for an outline font which has already been developed and is held in the dual port memory 4.

Fifth, when drawing a dot pattern in a page memory 10 by way of outline font development and when the font must be produced using a memory write operation as well as memory read operation in order to execute painting out of the inside of an outline font or execute logical operations of picture elements upon outline font development, the outline font is developed in the dual port memory 4, which can be accessed at a higher speed than the page memory. Then the font is transferred to the frame buffer memory to reduce the entire read/write frequency from and into the relatively low speed page memory 10. The alternative includes use of a memory read operation and a memory write operation executed successively and repetitively in order to execute logical operations of picture elements for development of an outline font and painting out of the inside of the font after such development directly on the page memory 10. In other words, the low speed page memory 10 must be accessed for writing only when a font produced on the dual port memory 4 is to be transferred to the page memory 10. Consequently, the processing time through final completion of the drawing can be reduced.

Sixth, the efficiency in data transfer from the dual port memory to the page memory 10 as described above can be improved by means of the DMAC 6, which is capable of making block transfer control of data. Where DMAC 6 is provided, the processing time through final completion of drawing in the page memory 10 or the like can be reduced. Processing time is reduced even when a logical operation of a picture element upon painting out of the inside of an outline font or development of an outline font is not executed.

Seventh, where the dual port memory 4, which is utilized as a working area such as font cache memory area, is formed on a same semiconductor substrate with the CPU 2 and the DSP 3 data processing or data transfer can be executed at a high speed. DSP 3 and CPU 2 can be accessed from different buses. Dual port memory 4 is utilized as a working area for logical operation processing of picture elements of a font, and for transfer of a font produced on the dual port memory 4 to the outside by the CPU 2 or the DMAC 6.

While the present invention has been described in detail in connection with the preferred embodiments, the present invention is not limited to the specific embodiments and can be modified or changed without departing from the spirit and scope of the invention as set forth herein.

For example, in the embodiments described above, data for drawing is transferred directly to the page memory from the dual port memory, which is utilized as a working area for font development. A large number of outline fonts may be developed and transferred to another memory for storage upon starting the system. Further, while the page memory 10 is constructed from a so-called dynamic RAM, because it requires a comparatively great capacity, it may alternatively be constructed from a static RAM.

In the foregoing description the present invention made by the inventor is described mainly when it is applied to a page printer such as a laser beam printer. The present invention is not limited to this and can be applied widely to drawing for a bit map display system, such a CRT display unit, and to any other data processing system. The present invention can be applied, at least, to a system which executes a large amount of calculations at a high speed.

Representative effects of the present invention disclosed herein will be described briefly below.

In particular, since a digital signal processor included in a data processing system has an architecture for executing a large amount of calculations at a high speed, the data processing system can execute required calculations such as floating point calculations at a higher speed than another data processing system which employs a co-processor such as an FPU. Consequently, a system which includes the digital signal processor and a microprocessor can execute a large amount of calculations at a higher speed than a data processing system which includes only a microprocessor or a microprocessor and a co-processor such as an FPU.

Further, the digital signal processor itself can execute a series of steps of data processing using a data processing algorithm of a built-in control storage device in accordance with an instruction of the microprocessor. The DSP operates in a parallel relationship to data processing operation of the microprocessor so the microprocessor can proceed with data processing independently of operation of the DSP. Accordingly, when the digital signal processor is executing data processing such as a floating point calculation, the microprocessor can proceed with independent or different processing from such data processing. Consequently, the digital signal processor can execute a large amount of calculations at a high speed without imposing a great burden to the microprocessor and without significantly restraining operation of the microprocessor.

Where a dual port memory can be accessed from both of the microprocessor and the digital signal processor by way of different buses, the digital signal processor can develop an outline font in the dual port memory or can utilize the dual port memory as a working area by way of the separate dedicated bus to which the microprocessor is coupled. Consequently, perfection of parallel operation of the microprocessor and the digital signal processor is assured. The operation efficiency of the entire system can be improved.

Where the microprocessor has a storage area for information which indicates a type of an outline font development which is instructed by the microprocessor, the dual port memory can be utilized simply as a font cache memory. Where the dual port memory is utilized as a font cache memory, outline font development need not be executed for an outline font which has already been developed and is held in the dual port memory.

When drawing a dot pattern in a frame buffer memory or a page memory by way of outline font development and when the font must be produced using a memory write operation and a memory read operation in order to execute painting out of the inside of an outline font or execute logical operations of picture elements upon outline font development, the outline font is developed in the dual port memory which can be accessed at a higher speed than the frame buffer memory or the page memory. Then the font is transferred to the frame buffer memory to reduce the processing time through the final completion of drawing. The alternative includes using a memory read operation and a memory write operation executed successively and repetitively in order to execute painting out of the inside of an outline font after the font has been developed directly on the page memory or the frame buffer memory.

Where a direct memory access controller, which can make block transfer control of data, is provided for the common bus to which the microprocessor and the dual port memory are coupled, the efficiency in drawing an outline font in the frame buffer memory or the page memory can be improved.

Where the dual port memory, which is utilized as a working area such as a font cache memory area, is formed on a same semiconductor substrate with the microprocessor and the digital signal processor, which can be accessed from different buses, data processing, and data transfer can be executed at a particularly high speed. The dual port memory is used as a working area including access to the dual port memory for development of a font by the digital signal processor, for the painting out processing of a developed font and for transfer of a font produced on the dual port memory to the outside of the microprocessor or the direct access memory controller.

Having thus described the invention, it is now claimed:

1. A data processing system formed on a semiconductor substrate, comprising:
    a microprocessor;
    a first bus to which said microprocessor and a memory are coupled;
    a digital signal processor, coupled to said first bus, and including storage means for storing a data processing procedure and executing means for executing processing of data transmitted through said first bus by accessing said memory in accordance with a command provided from said microprocessor through said first bus, in accordance with the procedure stored in said storage means;
    a second bus, coupled to said digital signal processor, which transfers at least data executed by said digital signal processor; and
    a dual port memory having a first port coupled to said microprocessor through said first bus and a second port coupled to said second bus, wherein the dual port memory stores the executed data by the digital signal processor and wherein said microprocessor includes means for accessing said dual port memory through said first bus and said digital signal processor includes means for accessing said dual port memory through said second bus.

2. The data processing system according to claim 1, wherein the memory stores outline font data.

3. A data processing system according to claim 2, wherein the dual port memory is stored with executed outline font data.

4. The data processing system according to claim 3, wherein the command indicates an outline font to be developed.

5. A data processing system formed on a semiconductor chip, comprising:
    a microprocessor;
    a first bus to which said microprocessor is coupled;
    a memory to be coupled to said first bus;
    a digital signal processor, coupled to said first bus and including storage means for storing a data processing procedure and executing means coupled to said storage means for executing processing of data transmitted through said first bus in accordance with the procedure stored in said storage means, wherein the data is transferred by accessing the memory in accordance with a command provided from the microprocessor through the first bus;
    a second bus coupled to said digital signal processor, wherein data executed by the digital signal processor is transferred through the second bus; and
    a dual port memory having a first port coupled to said microprocessor through said first bus and a second port coupled to said digital signal processor through said second bus, wherein the dual port memory stores the executed data by the digital signal processor and wherein said microprocessor includes means for accessing said dual port memory through said first bus and said digital signal processor includes means for accessing said dual port memory through said second bus.

6. The data processing system according to claim 5, wherein the memory stores outline font data.

7. The data processing system according to claim 6, wherein said data processing procedure is a data processing algorithm for developing outline font data in said dual port memory in the form of a pattern of dots.

8. The data processing system according to claim 7, further comprising a direct memory access controller having means for controlling block transfer of data and coupled to an access port of said dual port memory.

9. The data processing system according to claim 8, wherein said microprocessor has an area for storing therein information indicative of a type of outline font development to be instructed to said digital signal processor.

10. A data processing system according to claim 9, wherein the dual port memory is stored with outline font data developed in accordance with the data processing algorithm.

11. The data processing system according to claim 10, wherein the command indicates an outline font to be developed.

12. A data processing system formed on a semiconductor substrate comprising:
a microprocessor;
a digital signal processor including sequence control means for executing an operation instructed by said microprocessor, executing means, and control storage means for storing a data processing algorithm;
first bus means for transmitting data from said microprocessor; and
second bus means for transmitting data executed by said executing means.

13. The data processing system according to claim 12, further comprising a dual port memory coupled to the first bus means and to the second bus means, wherein the dual port memory includes means for being accessed from both of said digital signal processor and said microprocessor.

14. The data processing system according to claim 12, further comprising means coupled to the first bus means and to the second bus means, for storing data.

15. A method for generating outline font data in a processing system including a microprocessor, a digital signal processor (DSP) having control storage means for storing a data processing algorithm and a multi-port memory wherein the DSP and the memory are coupled via a dedicated bus and the microprocessor is coupled to the DSP and the memory via an internal bus, comprising the steps of:
(a) providing outline font development instructions including information to designate an outline font to be developed, from the microprocessor to the DSP through the internal bus;
(b) fetching unprocessed outline font data transferred in accordance with the instruction provided to the DSP and performing calculations and coordinate transformations on the data therein to develop the unprocessed outline font data in accordance with the data processing algorithm;
(c) storing the processed outline font data from the DSP into the multi-port memory through the dedicated bus; and,
(d) transmitting the processed outline font data to a display device through said internal bus.

16. The method of claim 15 wherein the system further includes a DMAC and wherein the DMAC provides block transfer of processed outline font data from the multi-port memory device to the display device.

17. The method of claim 16, wherein the step (c) is simultaneously performed with step (d).

18. A processing system for generating outline font data for transmission to a display device comprising:
a microprocessor;
a digital signal processor (DSP) including storage means for storing an outline font data development program and executing means for executing an outline development operation of data in accordance with said outline font data development program;
first bus means coupled to said microprocessor for transmitting data from said microprocessor; and,
second bus means coupled to said digital signal processor for transmitting data executed by said executing means.

19. The processing system of claim 18 further including
a dual port memory means coupled to the DSP via the second bus and coupled to the microprocessor via the first bus and
a direct memory access controller means (DMAC) for block transfer of the outline font data in the dual port memory means, wherein the DMAC is coupled to the dual port memory means via the first bus and wherein the dual port memory means can be utilized as font cache memory for transfer of the developed font data to a page memory associated with a display device.

20. The processing system of claim 19 wherein the DSP has an architecture means for cumulative multiplication and execution of parallel pipe line processing of instruction fetch and data transfer calculation.

21. The data processing system according to claim 18, further comprising means coupled to the first bus means and to the second bus means, for storing developed data.

* * * * *